(12) United States Patent
Vaananen

(10) Patent No.: US 10,885,140 B2
(45) Date of Patent: Jan. 5, 2021

(54) INTELLIGENT SEARCH ENGINE

(71) Applicant: Mikko Vaananen, Helsinki (FI)

(72) Inventor: Mikko Vaananen, Helsinki (FI)

(73) Assignee: Mikko Vaananen, Helsinki (FI)

( * ) Notice: Subject to any disclaimer, the term of this patent is extended or adjusted under 35 U.S.C. 154(b) by 0 days.

(21) Appl. No.: 16/842,881

(22) Filed: Apr. 8, 2020

(65) Prior Publication Data

US 2020/0327178 A1 Oct. 15, 2020

Related U.S. Application Data

(60) Provisional application No. 62/832,285, filed on Apr. 11, 2019.

(51) Int. Cl.
| | |
|---|---|
| *G06F 16/9536* | (2019.01) |
| *G06F 16/9538* | (2019.01) |
| *G06F 16/9537* | (2019.01) |
| *G06N 5/04* | (2006.01) |
| *G06N 20/00* | (2019.01) |

(52) U.S. Cl.
CPC ...... *G06F 16/9536* (2019.01); *G06F 16/9537* (2019.01); *G06F 16/9538* (2019.01); *G06N 5/04* (2013.01); *G06N 20/00* (2019.01)

(58) Field of Classification Search
CPC ............. G06F 16/9536; G06F 16/9537; G06F 16/9538
USPC ........................................................ 707/706
See application file for complete search history.

(56) References Cited

U.S. PATENT DOCUMENTS

| | | | | |
|---|---|---|---|---|
| 9,959,348 | B2* | 5/2018 | Staddon | G06F 16/9535 |
| 2002/0091661 | A1* | 7/2002 | Anick | G06F 16/951 |
| 2007/0011150 | A1* | 1/2007 | Frank | G06F 16/9537 |
| 2008/0005118 | A1 | 1/2008 | Shakib et al. | |
| 2009/0172514 | A1* | 7/2009 | Radovanovic | G06F 16/951 715/212 |
| 2009/0254572 | A1* | 10/2009 | Redlich | G06Q 10/107 |
| 2013/0288219 | A1 | 10/2013 | Dheap et al. | |

(Continued)

FOREIGN PATENT DOCUMENTS

| | | |
|---|---|---|
| WO | 2012104474 A1 | 8/2012 |
| WO | 2019102066 A1 | 5/2019 |

OTHER PUBLICATIONS

Moujahid, A. "A Practical Introduction to Deep Learning with Caffe and Python," retrieved from http://adilmoujahid.com/posts/2016/06/introduction-deep-learning-python-caffe/, published Jun. 26, 2016.

(Continued)

*Primary Examiner* — Mark E Hershley
(74) *Attorney, Agent, or Firm* — Mikko Vaananen

(57) ABSTRACT

A search engine (200, 500, 800), method and a system for performing a search is provided. The search engine (200, 500, 800) is connected to at least one mobile device (210, 510, 810) and at least one web crawler (222, 522, 822). The web crawler (222, 522, 822) is configured to index documents and classify said documents. The search engine (200, 500, 800) receives a query from the mobile device (210, 510, 810) which is determined to be best answered by a crowd-sourced answer. The search engine (200, 500, 800) searches the documents and delivers at least one crowd-sourced answer (318, 618, 918). The search engine (200, 500, 800) displays the crowd-sourced answer (318, 618, 918) to a user.

24 Claims, 13 Drawing Sheets

(56) References Cited

U.S. PATENT DOCUMENTS

| | | | |
|---|---|---|---|
| 2014/0279996 A1* | 9/2014 | Teevan | G06F 16/38 |
| | | | 707/706 |
| 2017/0046623 A1* | 2/2017 | Murdock, IV | G09B 19/06 |
| 2017/0124479 A1* | 5/2017 | Baughman | G06N 5/04 |
| 2017/0323212 A1* | 11/2017 | Volkov | G06N 20/00 |
| 2018/0030847 A1 | 2/2018 | Wall | |
| 2019/0043379 A1* | 2/2019 | Yuan | G06Q 50/20 |
| 2019/0108276 A1* | 4/2019 | Kovács et al. | G06F 16/3344 |
| 2019/0155904 A1* | 5/2019 | Santos Moraes | G06F 40/30 |
| 2020/0175087 A1* | 6/2020 | Sun | H04L 51/046 |

OTHER PUBLICATIONS

"Natural language processing," retrieved from https://en.wikipedia.org/wiki/Natural_language_processing, retrieved on Mar. 27, 2020.
"Automatic content recognition," retrieved from https://en.wikipedia.org/wiki/Automatic_content_recognition, retrieved on Mar. 27, 2020.
"Speech recognition," retrieved from https://en.wikipedia.org/wiki/Speech_recognition#End-to_end_automatic_speech_recognition, retrieved on Mar. 27, 2020.
Sahu et al., "Detecting Factual and Non-Factual Content in News Articles," Proceedings of the Fourth ACM IKDD Conferences on Data Sciences, Article No. 17, pp. 1-12, Mar. 9-11, 2017.
International Search Report and Written Opinion dated Jun. 24, 2020 in International Patent Application No. PCT/FI2020/050234.

\* cited by examiner

INTELLIGENT SEARCH ENGINE

TECHNICAL FIELD

The present disclosure relates to a search engine, and more particularly to a system and a method of performing a search by a search engine.

BACKGROUND

The current search engines are designed to obtain information that is available on the Internet. The search engine receives a query from the user. The query may have a factual answer. The query, for example, "which is the highest mountain in the world?" has a factual answer i.e. Mount Everest. On receiving the query, the search engine searches indexed information and presents the search results to the user. Most of the search results would reflect "Mount Everest" as the highest mountain in the world, since "Mount Everest" is the factual answer to the query. In another instance, the search engine receives a query that does not have a factual answer. For example, following query does not have a factual answer: "which mountain is more scenic—Mount Everest or Mount Godwin-Austen". A search for the query using the current search engines would lead to results having plethora of documents where "Mount Everest" or "Mount Godwin-Austen" would appear. Since, there are no factual answers to the query, the prior art search engines provide search results having mixed results. The user does not receive a useful answer for queries having non-factual answers.

US application 20180268061 (HORVITZ et al.) discusses a method for detecting biases in search results. Horvitz discusses detecting biases in search and retrieval (i.e., situations where searchers seek or are presented with information that significantly deviates from the truth). Once bias or potential bias is detected, Horvitz applies techniques to indicate and/or compensate for the bias. Such techniques may allow users to more easily assess the veracity of search results and increase the chances that users will locate accurate answers to their queries. Horvitz discusses using support of experts in a particular field to review and improve content in a search index. Horvitz determines labels for content in the search index through crowd-sourced human assessments.

In summary, Horvitz is focused on identifying biases in search results and applying techniques to compensate for the bias. Horvitz's techniques are focused on reviewing and improving content in search index using human efforts. However, such efforts involve significant investment of time, resources and costs. Also, the end results presented to the user are opaque in terms of providing analyzed factual basis. Like the known search engines, the search engine discussed in Horvitz provides a list of websites having different opinions. The user may not receive a useful answer for queries having non-factual answers. The shortcoming in the prior art search engines is that the non-factual queries are not answered well.

SUMMARY

It is an object of the invention to address and overcome the deficiencies in the discussed prior art.

It is an object of the invention to provide crowd-sourced answers to questions that are determined to have non-factual answers. The invention is a search engine that provides crowd-sourced answers for questions that do not have factual answers. To achieve this aim, technical software embodiments are produced in the following.

In one aspect of the invention, a search engine is connected to at least one mobile device and at least one web crawler. The web crawler is configured to index documents and classify the documents.

In one aspect of the invention, the search engine receives a question from the mobile device which is determined to be best answered by a crowd-sourced answer. In an example, upon receiving the question, the search engine determines whether the question has a factual answer or a non-factual answer. Further, the search engine determines whether to seek a crowd-sourced answer or not, based on a training set of questions and a validation set of questions. The determination to seek the crowd-sourced answer is done for a question that is determined to have a non-factual answer.

In one aspect of the invention, the search engine searches the documents and delivers at least one crowd-sourced answer. The search engine analyzes the indexed documents to determine all possible answers to the question. The search engine ranks each possible answer based on, for example, popularity. Subsequently, the search engine ranks the most popular crowd-sourced answer as first to the user. Other search results may also be ranked to the user in order of popularity.

In one aspect of the invention, the search engine displays the crowd-sourced answer to a user. The most popular crowd-sourced answer is ranked first and displayed to the user. Subsequently, a percentage breakdown of possible answers is also shown to the user.

A search engine connected to at least one mobile device and at least one web crawler is in accordance with the invention and characterized in that, the web crawler is configured to index documents and classify said documents, the search engine receives a question from the mobile device which is determined to be best answered by a crowd-sourced answer, the search engine searches the documents and delivers at least one crowd-sourced answer, and at least one crowd-sourced answer is displayed to a user.

In some aspects of the invention the search engine subjects the most popular crowd-sourced answer or search result to a veracity test. Similarly, other less popular search results or answers may be subjected to a veracity test. In response to failure or success in the veracity test, typically the most popular search result passing the veracity test is ranked first.

Typically, the web crawler is configured to crawl and index any of the following: text, voice, image and/or video, individually or in combinations. The search engine determines to seek a crowd-sourced answer for questions that are determined not to have an unambiguous factual answer. Also, the search engine may determine not to seek a crowd-sourced answer for questions that are determined to have an unambiguous factual answer. Sometimes the search engine seeks a crowd-sourced answer to a question that is contextual, and/or context data required to answer the question is derived from the mobile device of the user. The search engine calculates the most popular crowd-sourced answer or best matching answer by calculating different weights to different search results.

Typically, the AI based search engine is trained with a training set of questions and a validation set of questions. The search engine may also be trained with a training set of web crawler and/or index syntaxes and a validation set of web crawler and/or index syntaxes. The search engine ranks the most popular crowd-sourced answer, or best matching answer as first and displays the first ranked crowd-sourced answer or best matching answer to the user.

The search engine may also display a percentage breakdown of possible answers to the user on the display.

A method of performing a search by a search engine, the search engine being connected to at least one mobile device and at least one web crawler is in accordance with the invention and characterized by the following steps,

- configuring the web crawler to index documents and classify said documents,
- receiving a user query from the mobile device,
- determining the query to be best answered by a crowd-sourced answer,
- searching said documents and delivering at least one crowd-sourced answer, and
- displaying the at least one crowd-sourced answer and/or best matching answer to the user.

The method may also include subjecting the most popular crowd-sourced answer and/or the best matching answer to a veracity test. Typically, if the veracity test of the most popular crowd-sourced answer is failed, the most popular search result or best matching search result that is passing the veracity test is ranked first.

The method includes a web crawler to crawl and index any of the following: text, voice, image and/or video, individually or in a mix. The method also includes determining to seek a crowd-sourced answer for queries that are determined not to have an unambiguous factual answer. The method may further include determining to not to seek a crowd-sourced answer for queries that are determined to have an unambiguous factual answer. The search engine may also obtain a crowd-sourced answer to a query that is contextual, for example by deriving context data from the mobile device of the user.

It is possible in the invention to calculate the most popular crowd-sourced answer by calculating different weights to different results by conventional ranking methodology, without necessarily using AI. However, the invention may also use artificial intelligence (AI) and involve training the search engine with a training set of queries and a validation set of queries. The search engine can be taught AI with a training set of web crawler- and/or index syntaxes and a validation set of web crawler- and/or index syntaxes. The most popular crowd-sourced answer is typically ranked first and displayed to the user. A percentage breakdown of possible answers can also be displayed to the user.

A system comprising a search engine, at least one mobile device and at least one web crawler is in accordance with the invention and characterized in that,

- the web crawler is configured to index documents and classify said documents,
- the search engine is configured to receive a user query from the mobile device,
- the query is configured to be determined whether it is best answered by a crowd-sourced answer,
- the search engine is configured to search the documents and delivers at least one crowd-sourced search result or answer, and
- the search engine is configured to provide the search result or answer to the mobile station that is configured to display the crowd-sourced answer to the user.

A veracity module may be configured to subject the most popular crowd-sourced answer to a veracity test, and if the veracity test is failed, the most popular search result that passes the veracity test is ranked as first. Typically, the web crawler is configured to crawl and index any of the following text, voice, image and/or video, individually or in a mix.

The search engine is further configured to determine to seek a crowd-sourced answer to queries that are determined not to have an unambiguous factual answer. This can be achieved by observing and measuring the dispersion of possible answers, and calculating a numerical measure for the dispersion. Queries lacking an unambiguous factual answer typically exhibit a dispersion of different potential answers. For example, if 20 different answers occur in the results in 0-10% frequency, weights, or popularity, it is likely that a single correct factual answer is lacking. However, for the query: "How high is Mount Everest?", there is likely to be a 90-99% concentration of search results reciting 8848 m as the answer. In this case, the search engine is configured to not seek or produce further crowd-sourced answers, but rather display the unambiguous factual answer to the user.

The system is typically configured to seek a crowd-sourced answer to a query that is contextual, and derive required context data for example from the mobile device of the user. The system may be configured to calculate the most popular crowd-sourced answer by calculating different weights to different results by using a ranking algorithm. The most popular crowd-sourced answer is typically ranked first. The mobile station is typically configured to display the most popular crowd-sourced answer to the user first and/or to display a percentage breakdown of possible answers to the user on the display of the user terminal.

The system may also include a training module configured to train the search engine with a training set of queries and a validation set of queries. The training module is further configured to train the search engine with a training set of web crawler- and/or index syntaxes and a validation set of web crawler- and/or index syntaxes.

The invention has sizable advantages. The search engine is reliable as it generates useful answers to queries that do not have factual answers. The answers generated by the search engine are data-based answers. Thus, the answers provided by the search engine are very nearly accurate and reliable most of the time. In addition, answers to non-factual queries are automatically determined based on the information available on the Internet, thereby alleviating the need for manual intervention by a user. Thus, the present invention provides near accurate, reliable, and time-effective determination of crowd sourced answers to non-factual queries.

The best mode of the invention is the search engine running on the mobile device and/or the cloud as an app or being accessed with a web browser. The invention is providing answers to user queries not having unique factual answers. In the best mode, the search engine determines whether the query placed by a user has a factual answer or does not have a factual answer. If the query does not have a factual answer, the search engine searches indexed documents to generate at least one crowd-sourced answer. Subsequently, the search engine delivers at least one crowd-sourced answer to the user. The search engine also delivers analysis of the crowd-sourced answers. For example, a user inputs a query, "what is preferred—Pain au chocolat or plain Croissant", on a mobile device. The search engine analyzes the query and identifies that the query does not have a universal unique factual answer. It is a matter of taste. The search engine determines that the query is best answered by one or more crowd-sourced answers. The search engine subsequently searches the indexed documents. The indexed documents may include web sites, editorials, audio documents, image documents, video blogs, multimedia documents and the like. The search engine analyzes the indexed documents to determine at least one crowd-sourced answer.

The search engine analyzes the indexed documents to determine a distribution between "Pain au Chocolat" and "plain Croissant". Based on the documents, the search engine may identify that 80% of the people prefer Pain au Chocolat over the plain Croissants. Subsequently, the search engine generates at least one crowd-sourced answer based on the processing. Further, the search engine application displays the at least one crowd-sourced answer and the analysis. The search engine communicates to the mobile device and the mobile device displays the crowd-sourced answer as "80% of the people prefer Pain au Chocolat over the plain Croissant". Based on the search results, the user can quite safely assume that generally Pain au Chocolates are more preferred.

Some embodiments of the invention are described in the dependent claims.

DETAILED DESCRIPTION OF EMBODIMENTS

The inventive search engine is connected to at least one mobile device/client device and at least one web crawler.

The web crawler is configured to index documents and classify the documents. The search engine receives a query from a user of the mobile device which is determined to be best answered by a crowd-sourced answer. The search engine searches the documents and delivers at least one crowd-sourced answer. The crowd-sourced answer is then displayed to the user.

The search engine runs on a cloud server and on the client device as a client application. The search engine application may be available in Google Play™ store for downloading in Android smartphones, in App Store™ for downloading in iOS™ smartphones and/or in any other known application stores. The search engine application may either be available for free or as a paid application. Alternatively, the inventive search engine can also be accessed via a web browser.

The inventive search engine may deliver search results based on a deterministic search algorithm without the use of Artificial Intelligence. The search engine may also utilize Artificial Intelligence for several purposes. Known machine learning tools/deep learning frameworks may be utilized with or without modifications. A few such known machine learning tools comprise Caffe™, Api.ai™, TensorFlow™, Mahout™, OpenNN™, H20™, MLlib™, NuPIC™, OpenCyc™, Oryx 2™, PredictionIO™, SystemML™, TensorFlow™, and Torch™.

Figure 1:
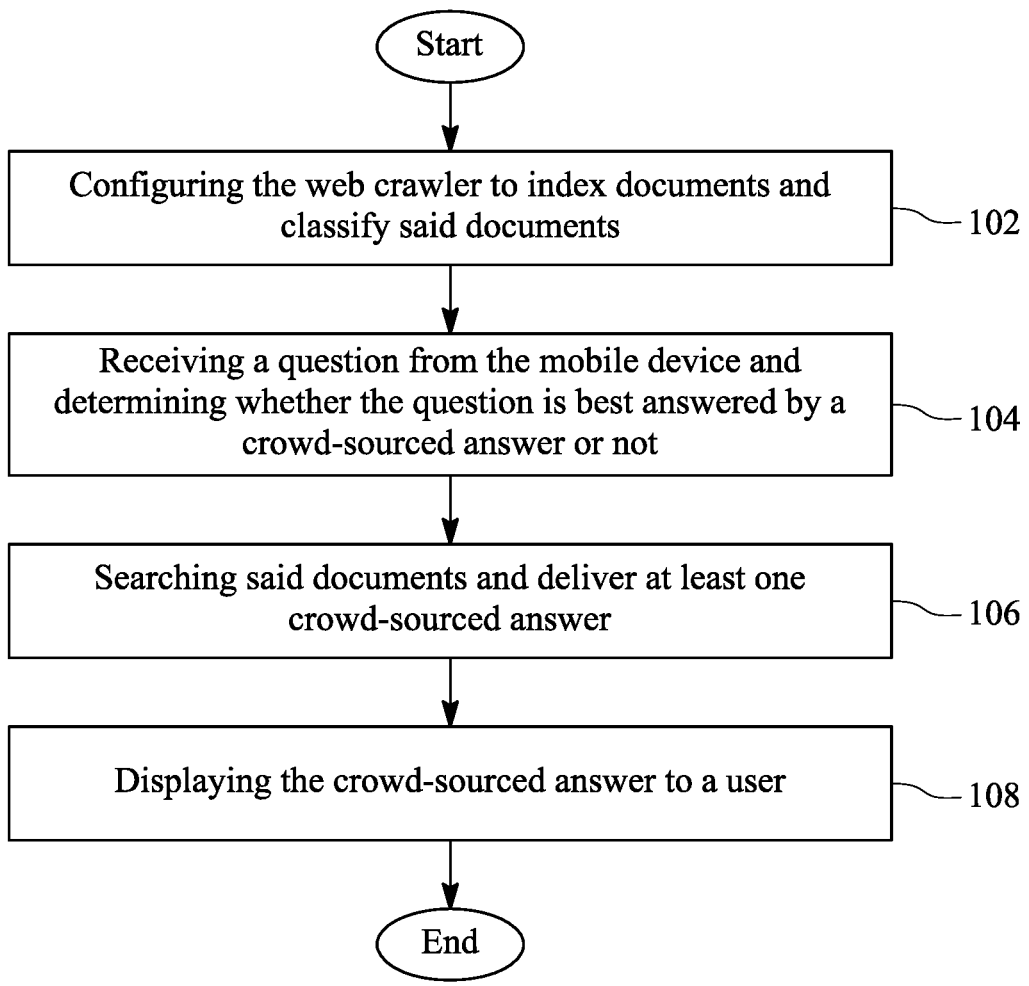
FIG. 1 illustrates an embodiment 10 of a flow chart showing a method of performing a search by a search engine in accordance with the invention.

FIG. 1 illustrates an embodiment 10 of a flow chart showing a method of performing a search by a search engine. The method may be implemented in systems disclosed in the embodiments 20, 50, and 80 in FIG. 2A, FIG. 5, and FIG. 8. An end-user of the method may use user interfaces disclosed in the embodiments 30, 60, and 90 in FIG. 3, FIG. 6, and FIG. 9A.

In phase 102, a web crawler is configured to index documents and classify the documents. The web crawler crawls the Web in a systematic manner for fetching the documents and information associated with the documents. The documents include web pages, images, text, files, audio, videos, combination thereof, and other files that characterize the web pages. The web crawler indexes the documents and the information associated with the documents against query words. When a query word is inputted by a user, the document where the query word appears, or the document that is relevant to the query word is quickly found by the search engine.

The web crawler may index the documents as fact based and opinion based, by recognizing the content. The web crawler analyzes the content of the documents to determine whether the content has facts or opinions. The web crawler may use semantic analysis, image processing techniques, audio processing techniques, and Automatic Content Recognition (ACR) techniques on text, image, audio and video respectively, to determine the content that the document provides, see Wikipedia ACR article in the references. The ACR technique identifies content in video files without requiring explicit information about the video. The ACR technique could be implemented to the inventive web crawler by using/reconfiguring and using a standard ACR service such as those provided by existing ACR service providers that include any of the following ACRCloud, Digimarc, Gracenote, Kantar Media, and Shazam.

The web crawler analyzes the content by searching for similar content in the index or performs further search to determine whether the content has facts or opinions. For example, the web crawler recognizes that the document shows the height of Mount Everest to be 8848 meters. The web crawler analyzes the indexed documents or searches to determine the accuracy of the height of Mount Everest. In response to identifying that substantial majority number of documents indicate that height of Mount Everest is 8848 meters high, the web crawler indexes these documents as fact-based documents.

On the other hand, the web crawler indexes a document to be opinion-based in response to recognizing opinions in the content of the document. For example, the document reciting "I love coffee" is recognized as an opinion-based document. The web crawler analyzes the indexed documents or searches to determine the content of documents with "love" and "coffee". In response to identifying that a multitude of different things are loved besides coffee, and that some documents recite disliking coffee, the web crawler indexes these documents as opinion-based documents.

The indexed documents are referred by the search engine in response to a user search query from a user. Examples of a web crawler may include but are not limited to a static crawler, a dynamic crawler, and an interactive crawler.

In phase 104, the search engine receives a query from the mobile device, and determining whether it is best answered by a crowd-sourced answer or not. Typically, if the query is determined to have a factual answer, this determination is negative, as the factually true answer is required by the user and provided to the user, and a crowd sourced answer is not needed. Typically, if the query is determined to have a non-factual answer, this determination is positive, and a crowd-sourced answer is produced to the user.

In one example, the query is received in a text- audio- and/or image form. Other forms of queries or combinations of formats are also possible as the query can be provided as a mix of text-, audio- and/or image input. Typically, the search engine processes text-based queries using text processing techniques such as Natural Language Processing (NLP), see Wikipedia NLP article in the references. NLP technology is a special branch of computer science programming and AI, used for automatically understanding human languages, and also to automatically write/speak in human languages. NLP is particularly useful as most of the time the users tend to provide unstructured human like queries to the search engine. The search engine processes the text input using text processing techniques.

Other forms of input, such as image or audio, the search engine may convert into text form, and process the alphanumeric form with NLP. Alternatively, the search engine may use image processing or audio processing techniques to determine the query in image or audio submitted, respectively. The search engine analyzes the query to determine whether the query has a factual answer or non-factual answer.

The search engine may use artificial intelligence for the analysis. The search engine performs semantic analysis for text inputs, image analysis for image inputs, audio processing for voice/audio inputs and video processing for video inputs or a combination of the aforementioned analysis for a query of such combined inputs. The search engine determines that a query having substantially the same answers from various information sources is a query having an unambiguous factual answer. In contrast, the search engine determines that a query having multiple different answers to the same query from multiple information sources is typically a query having non-factual answers. In response to determining that the query has a non-factual answer, the search engine determines that the query is best answered by a crowd-sourced answer.

A query, for example, "what is better for you: Coffee or Tea?" is a subjective query as the query does not have a factual answer. There will be a dispersion of search results, opinionating in favor of coffee or tea or neither. The extent of this dispersion of different search results could be used to determine that the query is non-factual. A numerical threshold for dispersion could be used, for example if 10% of search results advocate a different result than what is found in the remaining 90%, the query is non-factual. By contrast, if one answer is featured in 90%+ of the search result documents, the answer is factual. Thus, the determination can be made based on the dispersion of search result documents, simply by calculating and classifying the search result documents deterministically.

In one embodiment Artificial Intelligence can be used, and the search engine is trained with a plethora of training and validation queries and answers to identify whether the query has an unambiguous factual answer, or has non-factual answers. In the AI alternative the search engine uses a training model to determine that the query does not have an unambiguous factual answer. The training model may be stored in a cloud database of the search engine. The training model typically comprises a training set of queries and answers and a validation set of queries and answers. The search engine analyzes the query and answers and compares it with the features of the queries stored in the training model. Based on the comparison, the search engine determines whether the query has non-factual answers or not. If the comparison yields a high accuracy rate, then the query is identified to be a query having non-factual answers.

In step 106, the search engine searches the indexed documents and delivers at least one crowd-sourced answer. The search engine analyzes the indexed documents to determine available answers for the query. For the query: "what is better for you: Coffee or Tea?" the search engine may obtain documents from indexed documents based on keywords, contexts and other relevancies. The search engine analyzes the obtained documents to determine distributions in favor of Coffee and Tea. The search engine is configured to determine answers to the query from the content of documents. The search engine may use NLP techniques, ASR (Automatic Speech Recognition) techniques, and/or ACR techniques to determine answers in text, audio and/or video form, respectively, from the content of the document. For example, the search engine may determine that a blog favors Tea based on a text in blogger's write-up "Tea is best for improving metabolism". In another example, the search engine determines that a YouTube® video favors 'Tea' based on dietician's advice in favoring 'Tea', using ACR and ASR techniques. ASR technology is used for identifying and processing human voice. It is widely used in identifying words a person has spoken or to authenticate the identity of the person speaking, see Wikipedia end-to-end ASR article in the references. Based on the analysis of the indexed documents, the search engine generates at least one crowd-sourced answer. Subsequently, the search engine classifies the answers into different categories and generates a report, typically providing background statistics, of the crowd-sourced results.

In some embodiments the document number searched in order to make the determination in phase 104 is a lot smaller that the number of documents searched in phase 106 to arrive at the final search results. Already 10-100 relevant documents maybe sufficient to correctly decide whether the query is factual or non-factual. However, the production of accurate crowd sourced search results may require millions of documents.

In phase 108, the search engine displays the crowd-sourced answer to the user. The crowd-sourced answer is typically displayed on a user interface of the mobile device of the user. The crowd-sourced answer typically along with the analysis is displayed to the user. In one example implementation, the crowd-sourced answer is displayed as a hyperlinked text result along with percentages of different opinions. For the query, "what is better for you: Coffee or Tea?" the search engine may display a crowd-sourced answer: "60% of the users say tea is better for you than coffee". Visuals illustrating the distribution of the crowd-sourced opinion may also be displayed to the user in the user interface. For example, a pie chart indicating that 60% of the users say tea is better, 30% of the users say coffee is better, 5% of the users say both are better, and 5% of the users say both are bad for health, may be displayed in the user interface. Options to select portions of answer, portion of visuals, and the like, are provided to the user in the user interface. Specifically, the user can click on the portion of answer that says "25% of the users like tea better" or the corresponding portion of the visual for more detailed information. For example, the indexed documents used in forming the portion of the answer or chart can be provided to the user.

Any features of embodiment 10 may be readily combined or permuted with any of the other embodiments 20, 21, 22, 23, 30, 40, 50, 60, 70, 80, 90, and/or 91 in accordance with the invention.

Figure 2A:
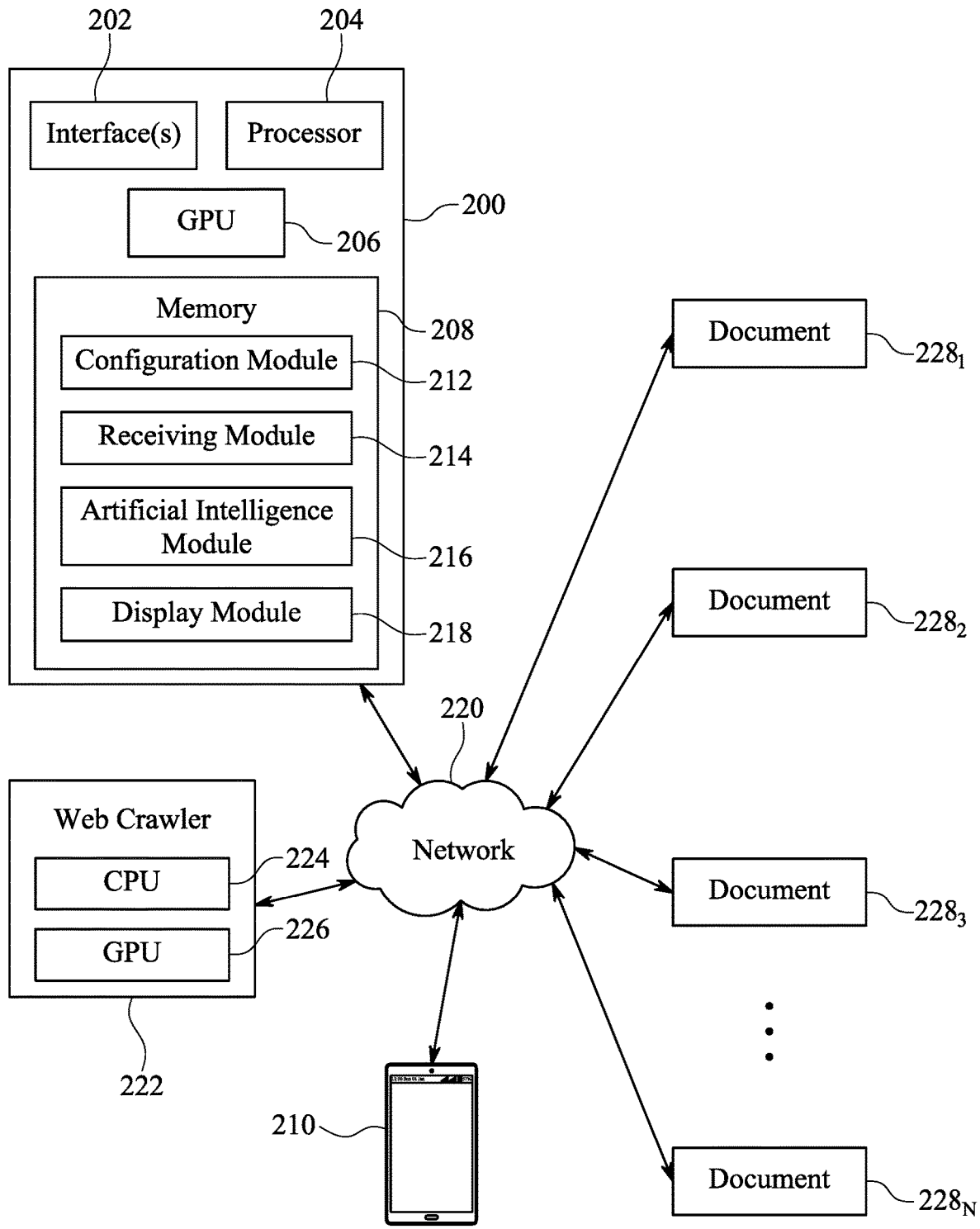
FIG. 2A illustrates an embodiment 20 of a block diagram of a system comprising a search engine for performing a search in accordance with the invention.

FIG. 2A illustrates an embodiment 20 of a block diagram of a system comprising a search engine 200 for performing the inventive search. The search engine 200 comprises interface(s) 202, a processor 204, a Graphical Processing Unit (GPU) 206, and a memory 208. The memory 208 comprises a configuration module 212, a receiving module 214, an Artificial Intelligence (AI) module 216, and a display module 218. In an embodiment, the search engine 200 is communicatively coupled with a client device 210 and a web crawler 222 through a communication network 220. The web crawler 222 includes, inter alia, a CPU 224 or a GPU 226, or preferably both as shown.

In an example implementation, the search engine 200 comprises one or more servers (not shown in FIG. 2A). The search engine 200 can be a database server, a file server, a web server, and/or an application server, which configured to index and store web pages, and provide search results in response to queries. In another example implementation, the search engine 200 comprises a plurality of databases for storing the data files. The databases may include any of the following: a structured query language (SQL) database, a NoSQL database such as the Microsoft® SQL Server, the Oracle® servers, the MySQL® database, etc. The search engine 200 is deployed in a cloud environment managed by a cloud storage service provider, and the databases may be configured as cloud-based databases implemented in the cloud environment.

In the self-learning or machine learning aspects of the invention, a neural network type of implementation for the search engine 200 and/or the web crawler 222 is possible. In some embodiments, both the search engine 200 and/or the web crawler 222 are realized as any of the following: SIMD (Single Instruction, Multiple Data) machine, MIMD (Multiple Instruction, Multiple Data) machine, and/or NIMD (Neural Instruction, Multiple Data) machine.

The search engine 200 includes an input-output device such as a monitor (display), a keyboard, a mouse and/or touch screen. However, more than one computer server is in use at one time, so some computers may only incorporate the computer itself, and no screen and no keyboard. These types of computers are typically stored in server farms, which are used to realize the cloud network used by the search engine 200 of the invention. The cloud servers for the search engine 200 can be purchased as a separate solution from known vendors such as Microsoft, Amazon and HP (Hewlett-Packard). The search engine 200 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected or configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the search engine 200 is preferred despite its high cost due to the reduced latency that is required and/or preferred for retrieving user data, user preferences, and data related to mobile/software applications etc.

Interface(s) 202 are used to interact with or program the search engine 200. The interface(s) 202 may either be a Command Line Interface (CLI) or a Graphical User Interface (GUI) or both. The processor 204 may be a microprocessor, microcontrollers, digital signal processors, a logic device, an electronic circuit, an application specific integrated circuit (ASIC), a field-programmable gate array (FPGA), a chip, etc. or any combination thereof, which can execute computer programs or a series of commands or instructions to process data.

The processor 204 may also be implemented as a processor set comprising a general-purpose microprocessor and a math or graphics co-processor. The processor 204 may be selected, for example, from the Intel® processors such as the Itanium® microprocessor or the Pentium® processors, Advanced Micro Devices (AMD®) processors such as the Athlon® processor, UltraSPARC® processors, microSPARC™ processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc.

The memory 208 includes a computer readable medium. A computer readable medium may include volatile and/or non-volatile storage components such as optical, magnetic, organic or other memory or disc storage, which may be integrated in whole or in part with the processor 204. Alternatively, all or part of the entire computer readable medium may be remote from the processor 204 and coupled to the processor 204 by connection mechanism, network cable and/or radio connection. In addition to the memory 208, there may be additional memories that may be coupled with the processor 204 or the GPU 206.

The communication network 220 may be wireless or wireline Internet or the telephony network, which is typically a cellular network such as UMTS (Universal Mobile Telecommunication System), GSM (Global System for Mobile Telecommunications), GPRS (General Packet Radio Service), CDMA- (Code Division Multiple Access), 3G-, 4G-, 5G-, Wi-Fi and/or WCDMA (Wideband Code Division Multiple Access) network.

The GPU 206 or 226 refers to a processor designed to manipulate and alter computer graphics, images, and memory to accelerate the analysis and creation of images/patterns. GPUs can be used in embedded systems, mobile phones, personal computers, workstations, game consoles, etc. The GPU 206 or 226 may be selected, for example, from AMD GPUs, Nvidia GPUs, Intel GPUs, Intel GMA, Larrabee, Nvidia Pure Video, SoC, etc. The machine learning or Artificial Intelligence parts of the processing are preferably configured to be executed by the GPU, due to the large number of parallel processing or comparative processing required in machine learning that are more efficiently processed by a GPU than a CPU. The description encompasses several modules, which are interpreted as programmed instructions stored in a segment of the memory 208, which when executed by the processor 204 or GPU 206 or 226, performs their functionalities.

The client device 210 may be a tablet or a mobile smartphone such as iOS, Android, a Windows Phone or any other smartphone that can execute applications. A user of the client device 210 accesses the search engine 200 through a search engine application installed on the client device or via a web browser. The user inputs a query to the search engine 200. A processing unit (not shown) present in the client device 210 processes data of software applications installed in the client device 210. It is also possible that the client device 210 is a mobile station, mobile phone or a computer such as a PC-computer, Apple Macintosh—computer, and/or PDA-device (Personal Digital Assistant). The client device 210 includes an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The web crawler 222 is a program implemented in memory and executed by the processor, which crawls the Web in a systematic manner for fetching documents $228_{1-N}$ and information associated with the documents $228_{1-N}$ including web pages, text, images, audio, videos and other files that characterize the web pages. The documents $228_{1-N}$ herein refers to content on the internet including web pages, images, videos, text, and/or audio. The web crawler 222 indexes the documents $228_{1-N}$ and information associated with the documents $228_{1-N}$ to a search index. The web crawler 222 typically indexes the documents as fact based and/or opinion based, by recognizing content in the documents. To achieve this, the web crawler analyzes the content of the documents to determine whether the content has facts or opinions, or both. For example, the web crawler recognizes that the document states that the height of Mount Everest is 8848 meters. The web crawler analyzes the indexed documents or searches to determine the accuracy of the height of Mount Everest. In response to identifying that a substantial number documents indicate that height of Mount Everest is 8848 meters, the web crawler indexes the document as a fact-based document.

On the other hand, the web crawler is configured to identify a document to be opinion-based by recognizing opinions in the content of the document. The search engine 200 uses the index to identify web pages that match the search query and extracts the identified web pages for presenting them to the user. Although the web crawler 222 is shown separately from the search engine 200, the web crawler 222 can be implemented, and is in fact typically implemented, as a part of the search engine 200. In one embodiment, the configuration module 212 configures the web crawler 222 to index documents $228_{1-N}$ and classify the documents $228_{1-N}$.

In operation, the receiving module 214 of the search engine 200 receives a query from the client device 210. The receiving module 214 may receive the query in text form, voice form image form, or as a mix of the aforementioned forms. Voice is typically converted to text by voice recognition software that may be AI controlled or implemented with a standard non-AI software solution. The query could then be processed by taking a dispersion snapshot of the results to determine the nature of the query and its answer. The dispersion snapshot may be possible to produce without using AI by means of a deterministic search engine algorithm. High and even dispersion to multiple different answers indicates a non-factual query, whereas concentration of search results on a single answer indicates a factual query with a factual answer.

The AI module 216 typically analyzes the query semantically, visually, or both semantically and visually. If the query is received in text form, then the AI module 216 analyzes the query semantically using NLP techniques. If the query is received in image form, then the AI module 216 analyzes the query visually using image processing techniques. If the query is received in an input form that is combination of text and image, then the AI module 216 analyzes the query both semantically and visually.

As an alternative or complement to the dispersion snapshot, once the query is received, the AI module 216 may determine if the query is to be best answered by a crowdsourced answer. The AI module 216 performs semantic analysis for text input, image analysis for image input, audio processing for voice/audio input and video processing for video input, or a combination of the aforementioned analysis for a query of combined input forms. The AI module 216 determines that a query having substantially the same answers from various sources is a query having a factual answer. On the other hand, the AI module 216 determines that a query having multiple different answers from different information sources is a query having a non-factual answer.

In one embodiment, the AI module 216 determines whether the received query has a factual answer or a non-factual answer based on analysis of the queries using a training model (hereinafter referred to as a model). The training model is stored in a cloud database of the search engine 200, and it can be used to analyze queries inputted via Internet browsers, or inputted via a search application of the search engine 200 via the network 220. The training model comprises a training set of queries and answers, and a validation set of queries and answers.

The AI module 216 analyzes the input query using the model. The query is compared with features of the queries stored in the model. The AI module 216 generates an output that identifies the query to be a query having non-factual answers if the comparison yields a high accuracy rate. By "machine learning" or "artificial intelligence", the computer system has been trained to make determinations based on a training set of samples, and/or the computer system has been tested with a validation set to have a known error rate. The way the training model is generated is further described in detail in conjunction with FIG. 2B.

The search algorithm and the visual AI analysis are used together to determine a type of query more accurately. In some embodiments, the GPU may carry out the visual AI tasks, and the processor may carry out the search algorithm tasks. The answer distribution is the key to determining the factual, or non-factual nature of the query and its answer. The search algorithm may analyze the answer distribution numerically/mathematically, and conclude that the answer distribution shown in FIG. 2C relates to a factual query, whereas the answer distribution in FIG. 2D would relate to a non-factual query.

The queries and their answer distributions may also be analyzed by visual AI analysis. When the query and the answer distribution image shown in FIG. 2C are subjected to the visual AI analysis explained in FIG. 2B, the outcome of the analysis would be that the query and the answer distribution image of 2C resemble that of a factual query and a factual answer, thereby causing the search engine to return the answer "Mount Everest" to the user. However, when the query of FIG. 2D and the answer distribution of FIG. 2D is inputted into the visual AI analysis, for example using the visual AI analysis algorithm of FIG. 2B, the search engine would conclude that the query and the answer distribution image resemble that of a query having a non-factual nature. The search engine would then for example output the percentages and a histogram diagram, or a pie chart, telling the user that of all people 30% prefer espresso, 25% filter coffee, 35% tea, and 10% green tea.

On determining that the query has non-factual answers, the search engine searches the indexed documents and delivers at least one crowd-sourced answer. The search engine analyzes the indexed documents to determine available answers for the queries. The search engine uses one or more of NLP (Natural Language Processing) techniques to analyze text for determining an answer in the documents.

In it's simplest version, the search engine may assume that the occurrence of "espresso" or other keywords "filter coffee", "tea", "green tea" correlate with how much people like the beverage. The most cited keyword is then provided with the highest percentage. This is of course primitive, and more elaborate ways of analyzing the semantic contents of the documents are in accordance with the invention. For example, when espresso is detected in the documents, the search index syntax may look for words in the proximity of the word "espresso" indicating whether "espresso" is being liked, or disliked. For example, the word "Delicious" close or next to "espresso" would contribute towards indicating a preference for espresso, whereas "disgusting" close to "espresso" would indicate a dislike for espresso.

If the search result numbers grow too large or small to be meaningful, the search engine adjusts the text string. For example, if the search result numbers are too high with "espresso", the search engine may adjust the search string to only "Which one is preferred: Espresso, Filter Coffee, Tea, Green Tea?". Further, if there are still too many search results in this set, the search engine may apply a contextual restriction, for example limit the searched documents to 3 month old documents, originating from US based websites or DNS servers only. Audio data is preferably converted to alphanumeric form to allow for the abovementioned semantic analysis, thereby expanding the semantically analyzable document universe. Image and video data is preferably pattern and color recognized and converted to alphanumeric form to allow for the abovementioned semantic analysis, thereby expanding the semantically analyzable document universe.

The search engine 200 and/or AI module 216 uses one or more image processing techniques to analyze image to identify an answer in the documents. The AI module 216 uses ASR techniques and ACR techniques to determine answers in audio content and video content, respectively. In the query: "Which one is preferred, espresso, Filter coffee, Tea or Green Tea?" the search engine determines that a blog favors Tea based on a text in blogger's write-up "Tea is best for improving metabolism". In another example, the search engine determines that a YouTube® video favors 'Tea' based on dietician's advice favoring 'Tea', using the ASR and ACR techniques.

If the query is determined to be a factual query, for example that of FIG. 2C, the display module 218 would typically display "Mount Everest" as the search result, if the query were "What is the highest mountain on Earth?". There would be no need to show K2 or Mauna Kea, as their height from the sea level is less than that of Mount Everest.

However, if the query is determined to be non-factual in nature, for example like the query of FIG. 2D, after determination of the crowd-sourced answers, the display module 218 displays the crowd-sourced answers along with the analysis via the user interface of the client device 210. In one example implementation, the crowd-sourced answer may be displayed as a hyperlinked text result along with percentages of different opinions. Considering query: "Which one is preferred, espresso, Filter coffee, Tea or Green Tea", the display module 218 displays the crowd-sourced answers: 30% of the users say Espresso, 25% Filter Coffee, 35% Tea and 10% Green Tea. The display module 218 may also display a graph illustrating the distribution of the crowd-sourced opinions. In one example, the display module 218 illustrates a pie chart indicating that 30% of the users prefer Espresso, 25% Filter Coffee, 35% Tea and 10% Green Tea.

The display module 218 also provides options to select portions of answer and portion of chart for displaying additional analysis. Specifically, the user can click on the portion of chart that says "30% of the users prefer espresso" for more analysis. In response to the selection, the display module 218 provides additional analysis. For example, the display module 218 displays indexed documents, or a list of the indexed documents in support of selected portion of the answer or chart, which documents may be one or more of text, audio, image and/or video.

Consider another example of performing a search for a query "what is preferred—Pain au chocolat or plain Croissant". Unlike the query having factual answers, this does not have a factual answer. In fact, the answer to the query varies from person to person. The user may input the query in the search engine via a web browser or via a search application of the mobile device. The search engine 200 identifies that the query does not have a factual answer. The search engine determines that the query is best answered by a crowd-sourced answer. The search engine 200 searches the indexed documents. The indexed documents include web sites, editorials, audio documents, image documents, video blogs, and/or multimedia documents. The search engine 200 analyzes the indexed documents to determine at least one crowd-sourced answer. The search engine 200 analyzes the indexed documents to determine a distribution towards "Pain au chocolat" and "plain Croissant".

Further, the search engine 200 processes the indexed documents to generate a crowd-sourced answer. The search engine 200 identifies that 80% of the indexed documents indicate that people prefer Pain au chocolat better than the plain Croissants. The search engine 200 generates at least one crowd-sourced answer based on the processing. The search engine 200 delivers the at least one crowd-sourced answer and the display module 218 displays the at least one crowd-sourced answer and the analysis. The display module 218 may display a crowd-sourced answer as "80% of the people prefer Pain au chocolat more than plain Croissant". The display module 218 may also display a graph illustrating the distribution of the crowd-sourced opinion. The display module 218 also provides selectable options such as hyperlink on the answer, or the selectable portion of the graph that the user can click to receive further analysis. The user can select the portion of the answer that says "80% of the people prefer Pain au chocolat" or the corresponding portion of the pie chart for more information. In response to the selection, the display module 218 provides an analysis breakdown. For example, the display module 218 displays indexed documents in support of selected portion of the answer or chart.

Any features of embodiment 20 may be readily combined or permuted with any of the other embodiments 10, 21, 22, 23, 30, 40, 50, 60, 70, 80, 90, and/or 91 in accordance with the invention.

Figure 2B:
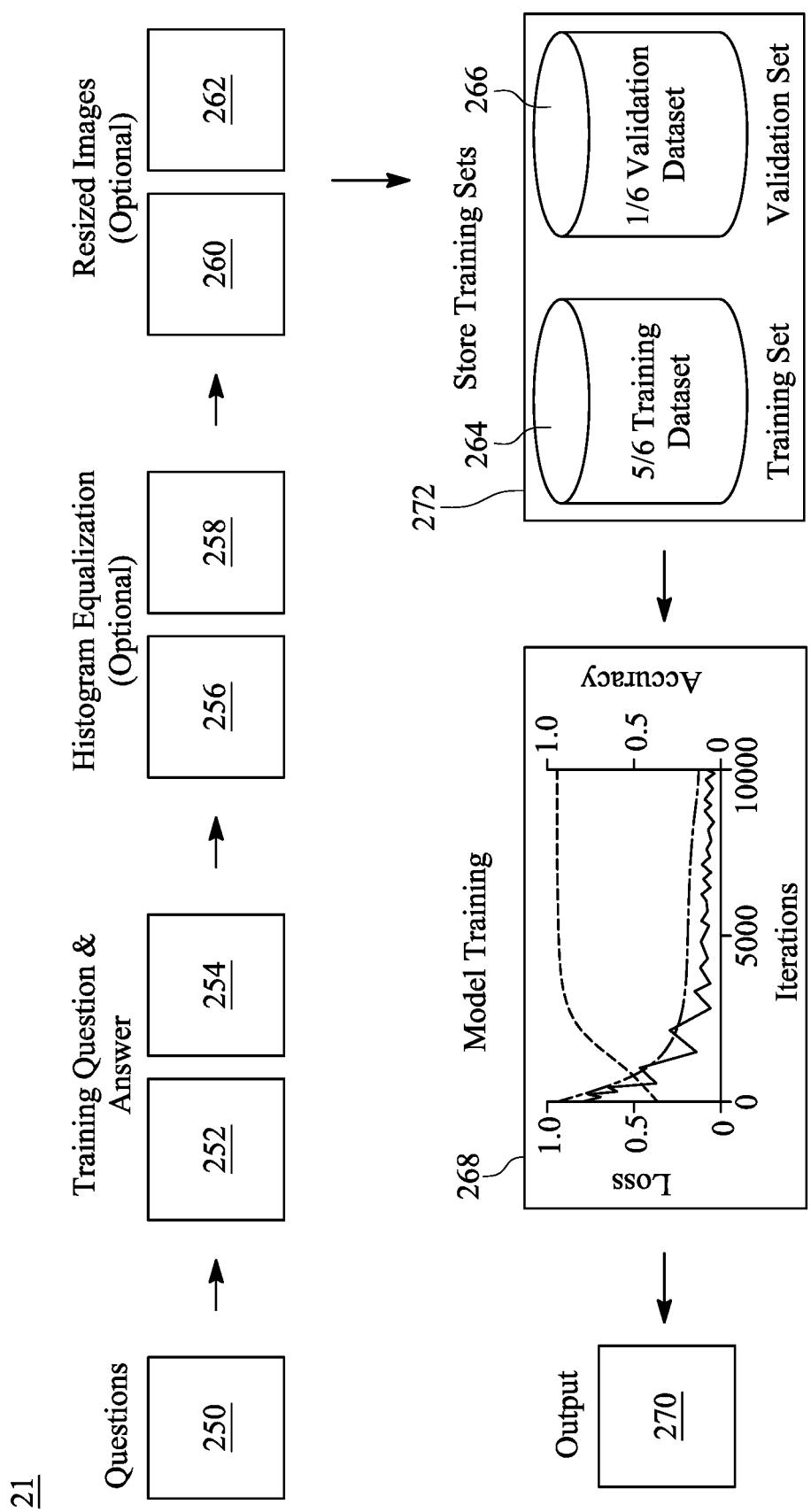
FIG. 2B illustrates a machine learning embodiment 21 where artificial intelligence is used to identify type of query in accordance with the invention.
Figure 2C:
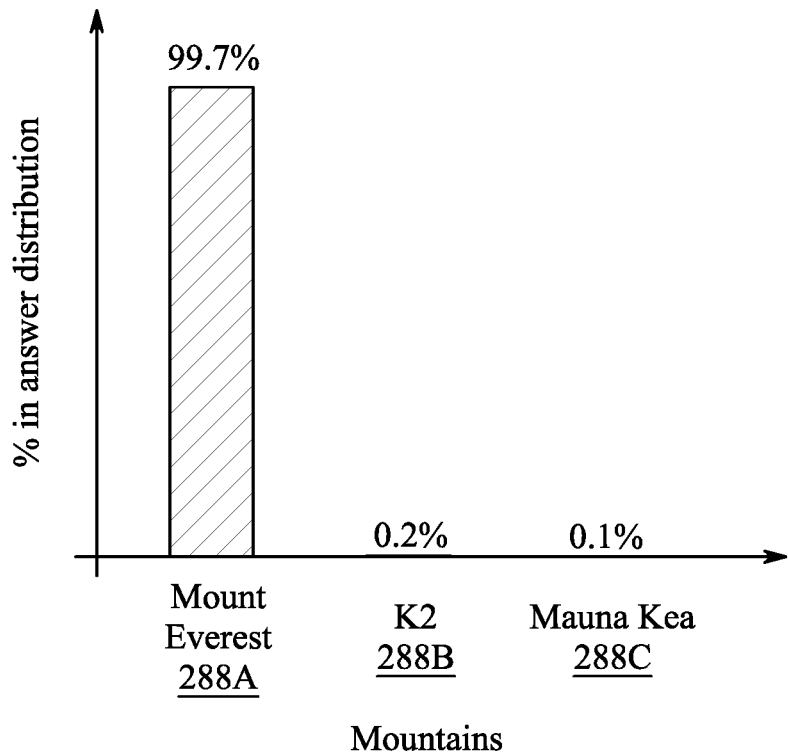
FIG. 2C illustrates an embodiment 22 showing an example of factual query and answer pair for training a search engine in accordance with the invention.
Figure 2D:
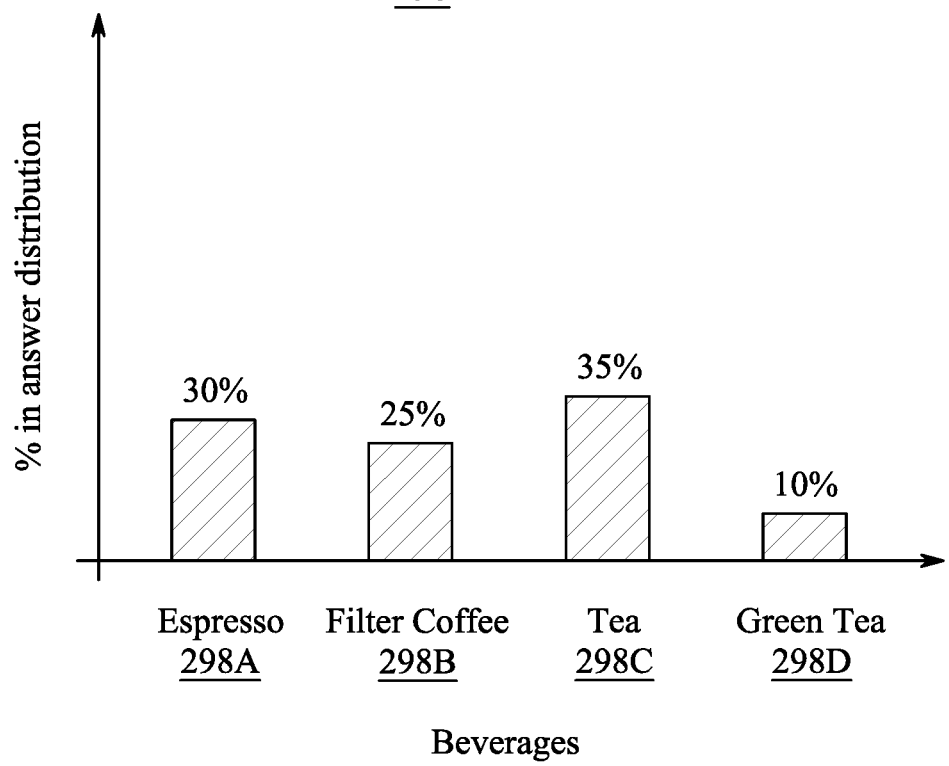
FIG. 2D illustrates an embodiment 23 showing an example of non-factual query and answer pair for training a search engine in accordance with the invention.

FIG. 2B illustrates a machine learning embodiment 21 where Artificial Intelligence (AI) is used visually for identifying a type of query by comparing query-image of answer distribution pairs. Quite clearly, a factual query should have one correct answer and produce an answer distribution image where majority of search results are condensed on that correct answer. Conversely, for a non-factual query the answer distribution image will be more scattered. the search results will be dispersed among multiple different answers. Embodiment 21 illustrates how the computer can be machine taught to distinguish between answer distribution images of factual and non-factual queries.

The AI module 216 utilizes Convolutional Neural Network (CNN) for determining whether the query has a factual answer or a non-factual answer. Numerous queries and answer distribution images, as shown in FIGS. 2C and 2D may be available from several sources, and preferably the GPU 206 performs multi-thread processing for obtaining precise and timely output based on the processing. The CPU 204 may also be used instead of the GPU 206 in some embodiments. In one example the GPU 206 may comprise Combined Unified Device Architecture (CUDA) for enabling the multi-thread processing of the indexed documents. The CNN comprises multiple layers of receptive fields that are small neuron collections configured to process portions of an input query. The output of each layer is successively tiled such that the input regions overlap to obtain a representation of the original image. In an embodiment, a deep learning framework called Caffe that uses C++, MATLAB, and Python programming languages is used for implementing the CNN. Caffe is a CNN library that is configured to support both CPU and GPU operations. In this example, the GPU 206 used by the search engine 200 may be for example an NVIDIA GPU with 15 GB RAM.

In an embodiment, the AI module 216 or the GPU 206 analyzes the queries and answers to determine a type of query. To analyze the queries, the AI module 216 or the GPU 206 utilizes AI for processing different details related to each of the queries and their answer distribution images.

The CPU 204 and/or GPU 206 of the search engine 200 may process content of each query to segregate each query into a corresponding category of having factual answers or non-factual answers. The semantic processing of the query with a search algorithm may comprise processing of title, words, tags, and dates present in each query. The semantic processing can be used by itself or in conjunction with the visual AI processing described in the below.

Typically the AI module 216 or the GPU 206 utilizing AI may segregate each query into a related category based upon recognizing the answer distribution image of a query. A pre-defined dataset 250 comprising a set of at least 30000 queries with factual answers and queries without factual answers and their respective answer distribution images are used as a training dataset for training the search engine computer network.

In one example, the training dataset can be manually developed. In yet another example, the training dataset can be semi-automatically created. The labelled queries and answers 252 and 254 are pre-processed and stored in a Python script format. In case of visual analysis, histogram equalization 256-258 and image resizing techniques 260-262 are used to make all answer distribution images comparable.

The training dataset is then divided into 2 subsets. First subset 264, also referred to as a training set 264, comprises $5/6^{th}$ portion of the training queries and answer distribution images that are used for training the AI model. The second subset 266, also referred to as a validation set 266, comprises $1/6^{th}$ portion of the training queries and answer distribution images that are used for calculating and validating the accuracy of the model. The training set 264 and the validation set 266 are stored in a cloud database 272 of the search engine server.

The CPU 204 or GPU 206 then performs feature standardization to make each feature in the dataset have a zero mean and a standard deviation of 1 such that all answer distribution image features are normalized. Feature standardization is used to ensure that measurement comparisons between features that may have different units are normalized. In feature standardization, the answer distribution images are centered on a zero mean with a standard deviation of 1. The mean query and answer distribution image of the training set 264 is calculated. The mean query and answer distribution image are subtracted from each query and answer distribution image in the training set 264. The resulting value of each query and answer distribution image is divided by its standard deviation. The resulting value of each query and answer distribution image is hence normalized and can be further used for creating the training model.

The CPU 204 or GPU 206 defines the training model by selecting CNN architecture. In this example, the CPU 204 or GPU 206 uses a CNN architecture model such as Alexnet for defining the model. Alexnet is a CNN framework executed on GPUs implemented in CUDA. CUDA is a parallel computing platform and an application programming interface (API) model created by Nvidia that can be used for general purpose processing along with graphics processing.

The training model is then optimized using a solver algorithm. The solver algorithm is a type of a stand-alone computer program or a software library that is configured to optimize the training model by computing an accuracy of the training model using the training dataset. The solver algorithm computes the accuracy by iteratively using the validation set 266. For example, the solver algorithm may use the validation set 266 for every 1000 iterations in an optimization process of 40000 iterations that takes a snapshot of the trained model at every $5000^{th}$ iteration.

The CPU 204 and/or GPU then performs model training using the results of the solver algorithm. During the training process, the CPU 204 and/or GPU 206 monitors losses and the model accuracy. In an example, Caffe takes a snapshot of loss and model accuracy of the trained model at every $5000^{th}$ iteration. Then the CPU 204 plots a learning curve of the losses as a function of the number of iterations as depicted in the graph 268 of FIG. 2B. Multiple iterations are performed until a steady-state accuracy rate is achieved. For example, as can be seen in the graph 268 the trained model achieves an accuracy rate of about 90% that stops improving after about 3000 iterations.

Once the trained model is ready, the CPU 204 or GPU 206 starts predicting accuracy of unseen query—answer distribution image pairs. The CPU 204 or GPU 206 reads a query from the testing dataset, processes the query and the answer distribution image, and calculates a probability of accuracy, for example, 0 for a query with factual answer, and 1 for a query with non-factual answer. For example, if an accuracy rate of 98% is achieved, that query has a non-factual answer.

Although the search engine is discussed with reference to using convolutional neural networks that may use the deep learning framework Caffe, C++, MATLAB, and Python programming languages, the NVIDIA GPU, the Kaggle dataset, and the Alexnet CNN architecture model, it is to be understood that the search engine 200 and the web crawler 222 may be implemented using any other deep learning algorithm that uses any other framework, programming language, GPU, dataset, and/or architecture model. This example 21 included herein is adapted and developed from a model described in the reference publication "A PRACTICAL INTRODUCTION TO DEEP LEARNING WITH CAFFE AND PYTHON", which is included here as a reference.

The visual approach is good in that it captures the intuitive human response to what is a factual and what is non-factual query-answer distribution image. The reason is biological. The human brain has the best control over eyesight, over any other sensory path. Therefore, it would make sense to train the computer to do human-like determinations of factual/non-factual nature with visual data.

However, it is in accordance with the invention that the determination could be done statistically too. In its simplest embodiment a dispersion threshold is set. If the dispersion of answers between two or more answer alternatives grows over a certain numerical limit, for example there is no single answer with more than 70% of search results, then the query could be classified as non-factual.

One useful strategy in accordance with the invention is also to first capture from humans, for example by showing graphical charts, which query—answer distribution pairs are judged by humans to be factual or non-factual. The dispersion in the answers and the graphical charts is then converted to a numerical measure, which is roughly in the middle, and distinguishes a query with a factual answer from a non-factual answer.

Any features of embodiment 21 may be readily combined or permuted with any of the other embodiments 10, 20, 22, 23, 30, 40, 50, 60, 70, 80, 90, and/or 91, in accordance with the invention.

FIG. 2C illustrates an embodiment 22 showing an example of query and answer dispersion image pair for training the search engine where artificial intelligence is used for identifying the type of query. FIG. 2C illustrates a query "What is the highest mountain on Earth?" 280. A search for query would lead to search results comprising documents having 99.7% of answers 288A indicating Mount Everest as the highest mountain. Other comparatively insignificant answers include Mount K2 identified in 0.2% of documents 288B and Mauna Kea identified in 0.1% of documents 288C. Overwhelming number of answers for the query clearly indicates that the query is a factual query having an unambiguous answer. The AI module 216 is trained to identify such a query and answer dispersion image pair as a factual query having a non-ambiguous answer. The AI module 216 is trained to identify a query as a factual query having an unambiguous answer when the AI module 216 encounters similar answer dispersion images.

Any features of embodiment 22 may be readily combined or permuted with any of the other embodiments 10, 20, 21, 23, 30, 40, 50, 60, 70, 80, 90, and/or 91 in accordance with the invention.

FIG. 2D illustrates an embodiment 23 showing another example of a query and answer dispersion image pair for a search engine where artificial intelligence is used for identifying the type of query. FIG. 2D illustrates a query "Which one do you prefer—espresso, filter coffee, tea, or green tea" 290. A search for the query would lead to search results having 30% documents 298A preferring espresso, 25% documents 298B preferring filter coffee, 35% documents 298C preferring tea and 10% documents 298D preferring green tea. Such division of answers indicates that the query does not have a factual answer or has multiple answers. The AI module 216 is trained to identify such a query and answer dispersion image pair as a non-factual query having different answers. The AI module 216 is trained to identify a query as a query having non-factual answer when the AI module 216 encounters similar answer dispersion images.

Any features of embodiment 23 may be readily combined or permuted with any of the other embodiments 10, 20, 21, 22, 30, 40, 50, 60, 70, 80, 90, and/or 91 in accordance with the invention.

Figure 3:
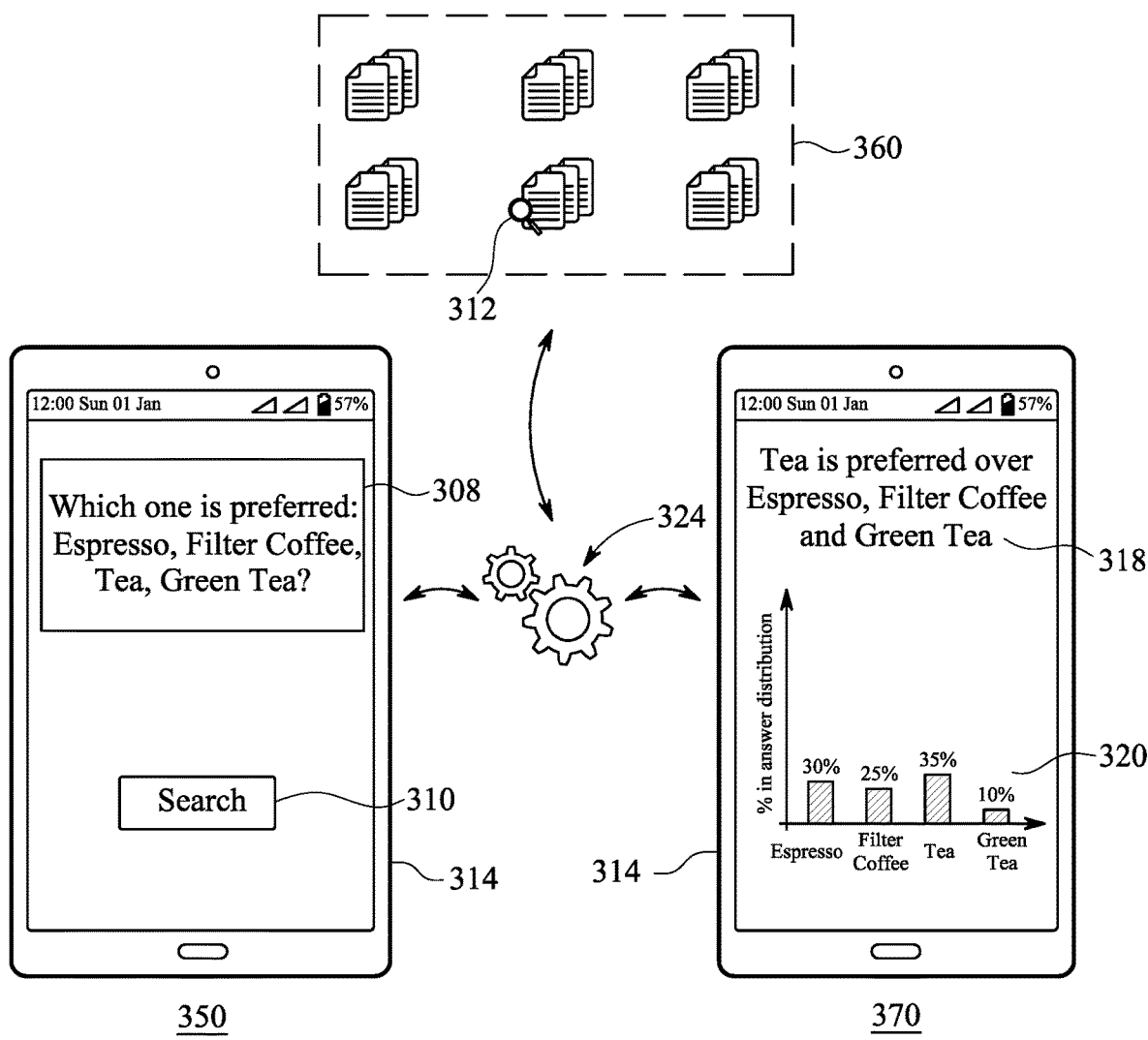
FIG. 3 demonstrates an embodiment 30 of a user interface illustrating a search operation in accordance with the invention.

FIG. 3 demonstrates an embodiment 30 of a user interface in accordance with the invention as a screen shot diagram. The user interfaces show a simple process of search operation. The user interface is displayed on a display screen of a mobile client device 314, such as a smartphone.

A search engine application is stored on a non-transient memory medium i.e. a memory of the mobile client device 314. Alternatively, a mobile Internet browser can also be used. Exemplary user interfaces where the user inputted a query that does not have an unambiguous factual answer is shown in FIG. 3. The user interface 350 includes a search engine application screenshot on a mobile device. A user can provide a search query into the text box 308. A 'search' button 310 is provided for the user to trigger a search operation.

Alternatively, a search query can be inputted by uploading of image-, voice- and/or video-data. The user can use the mobile phone to capture an image drawn by the user or capture an image with the mobile phone camera having visual query data. The search engine 200 typically provides different options for submitting query data. For example, image data relevant to the query can be captured with the mobile phone camera for the surroundings, or image data used in the query can be selected from the internet and/or from the filesystem of the user's mobile phone/computer.

The search engine 200 may use image processing techniques to identify query parameters from the image, for example text can be recognized from the image with OCR. Likewise, the search engine 200 may provide options to record audio containing the query or upload the audio containing the query. The search engine 200 may use audio processing techniques to identify a query from the audio clip. The search engine 200 may perform semantic analysis for text input, image recognition for image input, audio processing and voice recognition for voice/audio input and video processing with image recognition and/or voice recognition for video input, or a combination of the aforementioned analysis for queries of combined input forms.

The search engine 200 determines that a query having substantially same answers from various sources is a query having factual answer. However, in FIG. 3 the search engine has determined that a query having multiple answers is a query having non-factual answers, and the different answers of FIG. 2D are here displayed in a pie chart on the mobile phone screen via the mobile browser or a search engine app.

A box 360 (shown in dashed line) illustrates a background document retrieval operation from indexed documents in response to triggering the search operation. The search engine searches 312 the indexed documents to determine at least one crowd-sourced answer. The search engine and/or AI module 216 determines answers from contents of the documents. The AI module 216 uses NLP techniques, ASR techniques, and/or ACR techniques to determine answers from the content of the documents. The AI module 216 performs analysis 324 to provide multiple crowd-sourced answers 318 and a breakdown of the search results 320.

Interface 370 illustrates a search result screenshot of the mobile device 314 with the crowd-sourced answer 318 and the analysis result in a form of a graph 320. FIG. 3 is illustrated in the context of performing a search with a query from the mobile device 314 which is determined to be best answered by a crowd-sourced answer. Although FIG. 3 illustrates the search application providing the user interfaces that requires a user to select options through a touch screen, it can be appreciated that the search engine is designed as compatible with any client device that may be capable of accepting voice commands, tactile commands, and/or gesture-based commands.

Any features of embodiment 30 may be readily combined or permuted with any of the other embodiments 10, 20, 21, 22, 23, 40, 50, 60, 70, 80, 90, and/or 91 in accordance with the invention.

Figure 4:
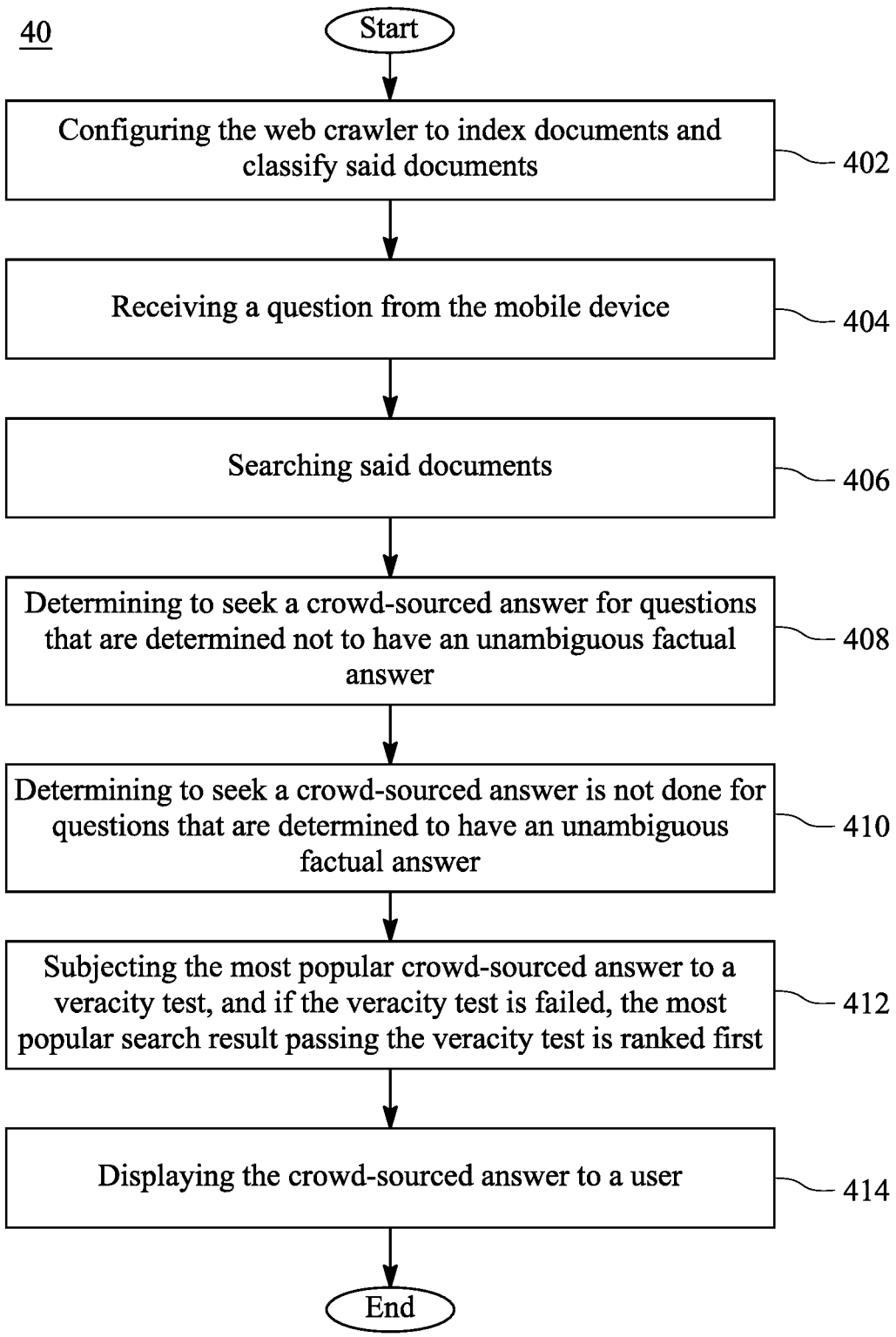
FIG. 4 illustrates an embodiment 40 of a flow chart showing a method of performing a search in accordance with the invention.

FIG. 4 illustrates an embodiment 40 of a method of performing a search, shown in a flow chart. The different phases/steps mentioned in FIG. 4 are not necessarily performed in the mentioned sequence but could be performed in a different order.

In phase 402, a web crawler is configured to index documents and classify said documents. The web crawler indexes the documents and information associated with the documents in an index. A search engine uses the index to identify web pages that match a search query and to extract the identified web pages for presenting hyperlinks of webpages to a user. Phase 402 is typically ongoing all the time. New material is published on the Internet all the time, and preferably the web crawlers of the invention index documents day and night with regard to the factual/non-factual nature of the documents.

In phase 404, a query is received from a user of a client device. In one example implementation, the query is received in a text form. In another example implementation, the query is received in an image/audio/video form.

In phase 406, indexed documents are searched. AI and/or a search result snapshot produced by a search algorithm is used to differentiate between queries having an unambiguous factual answer and queries having multiple non-factual answers. The search result snapshot is not necessarily shared with the user, but is used internally by the search engine to determine the factuality of the query. As explained in the preceding embodiments, the factuality/non-factuality determination can be done either numerically or based on the graphical presentation of the answer distribution. If the determination is done numerically, the processor that does the determination is typically a CPU. However, if the determination is preferably based upon the graphical data, the processor that is most suited to analyzing the graphical data is a GPU, in accordance with the invention.

Sometimes step 406 can be bypassed. For example, if the query has been just presented and processed before, and it is e.g. stored in the cache or other available memory that the query is factual, the process can directly move to phase 410. Similarly, if the cache or other available memory indicates that the query is non-factual, the process can move directly to 408.

In phase 408, AI and/or search algorithms are used to determine that the received query is best answered by a crowd-sourced answer. Preferably this determination is done to a query that has answers that are dispersed among multiple non-factual alternatives as explained before. If no answer dispersion, or almost no answer dispersion is detected, it is likely that the query is factual, and the process moves directly to phase 410.

The indexed documents are searched and at least one crowd-sourced answer and/or search result is determined. AI and/or search algorithms are used to analyze the indexed documents to determine matching answers and search results to the query. Crowd-sourced answers are generated based on the search results received from the indexed documents. Based on the search results, at least one crowd-sourced answer is determined, and a listing and/or percentage breakdown of all possible crowd-sourced answers is generated.

In phase 410, if the query is determined to have an unambiguous factual answer or a clearly matching search result, crowd sourced answers and/or search results are not searched. Instead, the factual answer is searched, retrieved and provided to the user.

In phase 412, the most popular crowd-sourced answer and/or search result is subjected to a veracity test. The popularity of the crowd-sourced answer is based on ranking of indexed documents used in determining the crowd-sourced answer. Most popular results are preferably ranked highest.

In one embodiment, the crowd-sourced answer or search result is compared with one or more sources to determine the veracity of the answer. The sources can be references having reliable information. For example, for all government related matters, a government website or an Official Journal can be an information source for the purposes of the veracity test. In another example, a reputed chef's journals are used as a source for testing the veracity of food related matters.

It is also possible that veracity reviews done by independent fact checking websites such as www.snopes.com or the like are used to establish a veracity score for search results. If a search result has been tagged by a fact checking website to contain fraudulent or incorrect information, that can be configured to be used as a basis for failing the veracity test. Similarly, a positive or neutral review from a fact checking website can be used to improve the veracity score of the search result.

As the library of verified publications grows, the truth database of true and correct information grows with which the veracity test can be executed. Also, some DNS addresses, or URL addresses known to contain true information can be white listed so that they always receive the maximum veracity score.

In yet another example, human-facilitated test is used to determine the veracity of the at least one or more most popular crowd-sourced answer(s) or search results. Failure of the veracity test for a crowd-sourced answer or search result typically leads to the removal of that answer or search result from the result list. Typically, the most popular search result or crowd sourced answer passing the veracity test is ranked first.

In phase 414, at least one crowd-sourced answer along with the analysis is displayed to the user through the user interface of the client device. In one example implementation, the crowd-sourced answers are displayed as hyperlinked text results, along with a percentage breakdown of different opinions. A graph illustrating the distribution of the crowd-sourced opinion split between different answers or search results may also be displayed to the user.

If the query was determined to be factual in 410 the factual answer and/or factual search result is typically displayed to the user on the client device screen.

Any features of embodiment 40 may be readily combined or permuted with any of the other embodiments 10, 20, 21, 30, 50, 60, 70, 80, 90, and/or 91 in accordance with the invention.

Figure 5:
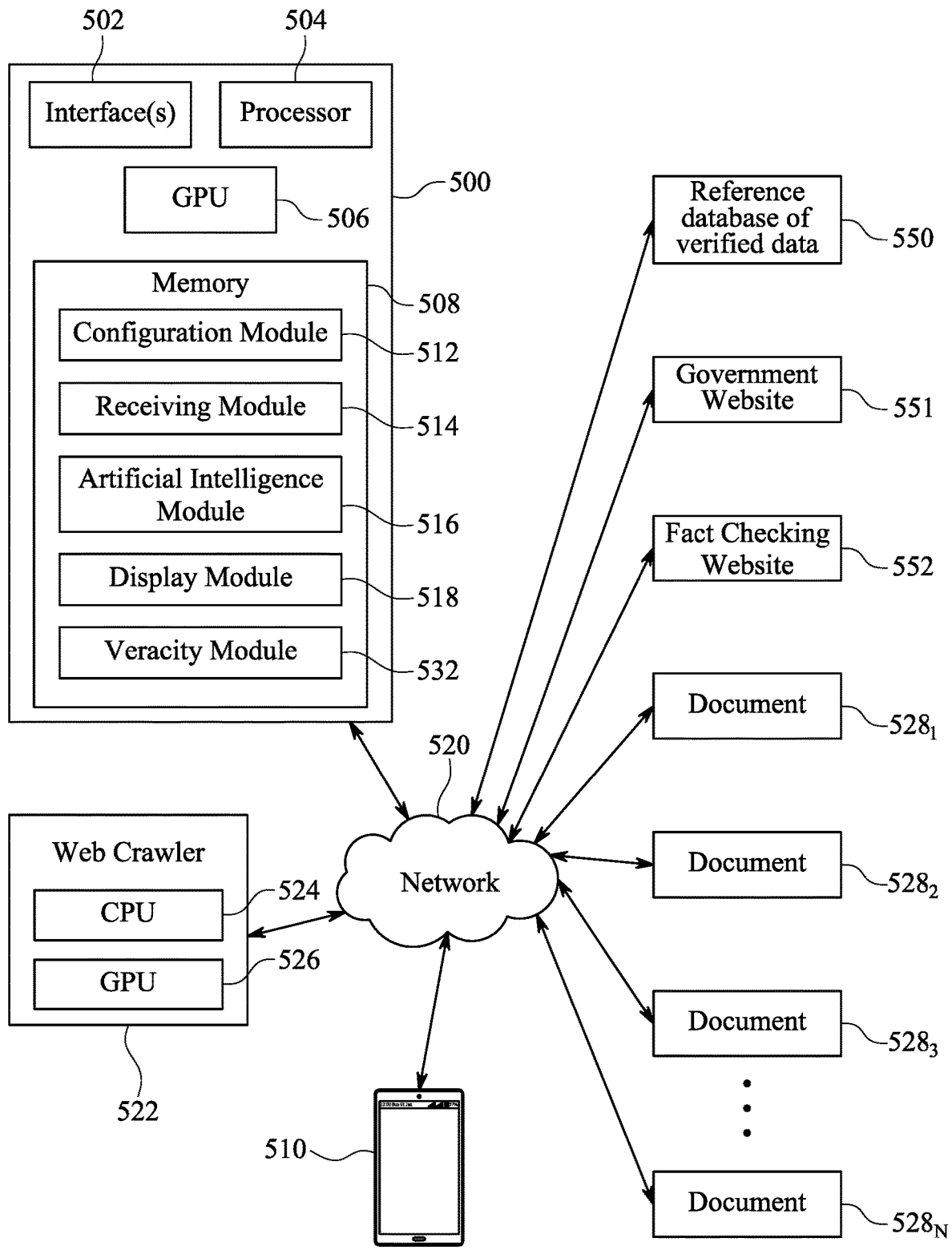
FIG. 5 illustrates an embodiment 50 of a block diagram of a system comprising a search engine for performing a search in accordance with the invention.

FIG. 5 illustrates an embodiment 50 of a block diagram of a search engine 500. The search engine comprises interface(s) 502, a processor 504 and/or a GPU 506, and a memory 508. The memory 508 comprises a configuration module 512, a receiving module 514, an Artificial Intelligence (AI) module 516, a display module 518, and a veracity module 532.

In an embodiment, the search engine 500 is communicatively coupled with a client device 510 and a web crawler 522 through a communication network 520. The CPU 524 and/or the GPU 526 and the communication network 520 are similar to the GPU 222, the CPU 224 and the communication network 220 shown in FIG. 2A. The configuration module 512, the receiving module 514, the AI module 516, and the display module 518 are similar to the configuration module 212, the receiving module 214, the AI module 216, and the display module 218 shown in FIG. 2A respectively.

The configuration module 512 configures the web crawler 522 to index documents $528_{1-N}$ and classify said documents $528_{1-N}$. The web crawler 522 indexes the documents $528_{1-N}$ and information associated with the documents $528_{1-N}$ in an index. The search engine 500 uses the index to identify web pages that matches the search query and to extract the identified web pages for presenting it to a user.

The receiving module 514 receives a query from a user of the client device 510 which is determined to be best answered by a crowd-sourced answer. In one example implementation, the receiving module 514 receives the query in a text form. In another example implementation, the receiving module 514 receives the query in an image form.

The search engine 500 determines that the received query is best answered by a crowd-sourced answer. The search engine 500 differentiates between queries having an unambiguous factual answer and queries having an ambiguous factual answer with any of the methods explained before or their combinations or permutation.

In response to determining the query to be non-factual and best-answered by the crowd-sourced answer, the search engine 500 searches the indexed documents and delivers at least one crowd-sourced answer. For queries that are determined to have an unambiguous factual answer, the search engine does not seek a crowd-sourced answer. For example, for a query seeking information on the highest peak in the world, the search engine 500 does not seek a crowd-sourced answer, but produces "Mount Everest" as the answer and/or search result as textual data as explained before or by listing a factual search result document.

In response to the determining that the query does not to have an unambiguous factual answer, the search engine 500 seeks a crowd-sourced answer. Based on the search, the search engine 500 determines the at least one crowd-sourced answer and/or search result and generates a listing of the crowd-sourced answers and/or search results and their percentage breakdowns.

Subsequently, the veracity module 532 subjects the most popular crowd-sourced answer, or some or all of the answers or search results to a veracity test. In one embodiment, the crowd-sourced answer or search result is compared with one or more information sources to determine the veracity of the answer and/or search result. The sources can be references having reliable information. For example, for all government related matters, a government website 551 or database or an Official Journal can be an information source providing reliable information for the purposes of the veracity test. In another example, a reputed chef's journals are used as a source for testing the veracity of food and recipe related matters.

It is also possible that the veracity module 532 uses veracity reviews done by independent fact checking websites 552, such as www.snopes.com or the like, which reviews are used to establish a veracity score for search results. If a search result has been tagged by a fact checking website to contain fraudulent or incorrect information, the search engine 500 can be configured to use that as a basis for failing the veracity test. Similarly, a positive or neutral review from a fact checking website can be used to improve the veracity score of the search result.

As the library of verified publications grows, the truth database 550 of true and correct information that the search engine 500 can access grows. This of course provides an ever broader basis of verification references with which the veracity test can be executed. Also, some DNS addresses, or URL addresses known to contain true information can be white listed so that they always receive the maximum veracity score.

In yet another example, human-facilitated test is used to determine the veracity of the at least one or more crowd-sourced answer(s) or search results. Failure of the veracity test for a crowd-sourced answer or search result typically leads to the removal of that answer or search result from the result list.

Typically, at least one crowd-sourced answer is displayed to the user through the screen of the client device 510. In one example implementation, the crowd-sourced answers are displayed as hyperlinked text results, along with a percentage breakdown of different opinions. A graph illustrating the distribution of the crowd-sourced opinion split between different answers or search results may also be displayed to the user. Typically, the most popular search result or crowd sourced answer passing the veracity test is ranked first.

In some embodiments the display module 518 also displays a graph illustrating the distribution of the crowd-sourced opinion. The display module 518 may also provide user options to select portions of answer and portion of chart for displaying and viewing additional data and analysis. The display module 518 may also be configured to present the list of search results supporting the portion of a crowd-sourced answer, or providing the statistical basis of the crowd sourced answer to the user.

If the query was determined to be factual, the factual answer and/or factual search result is typically displayed to the user on the client device 510 screen. Similarly, the supposedly factual answer and/or search result can be subjected to a veracity test. Of course, the veracity test should indicate an extremely high veracity score if the original determination about the factual nature of the query and the answer and/or search result was correct. If not, this observation could be flagged, and the information sources, query, and the algorithms could be investigated to find out what causes this discrepancy. The successful removal/fixing of the discrepancy would of course improve the accuracy of the information retrieval system.

Any features of embodiment 50 may be readily combined or permuted with any of the other embodiments 10, 20, 21, 22, 23, 30, 40, 60, 70, 80, 90, and/or 91 in accordance with the invention.

Figure 6:
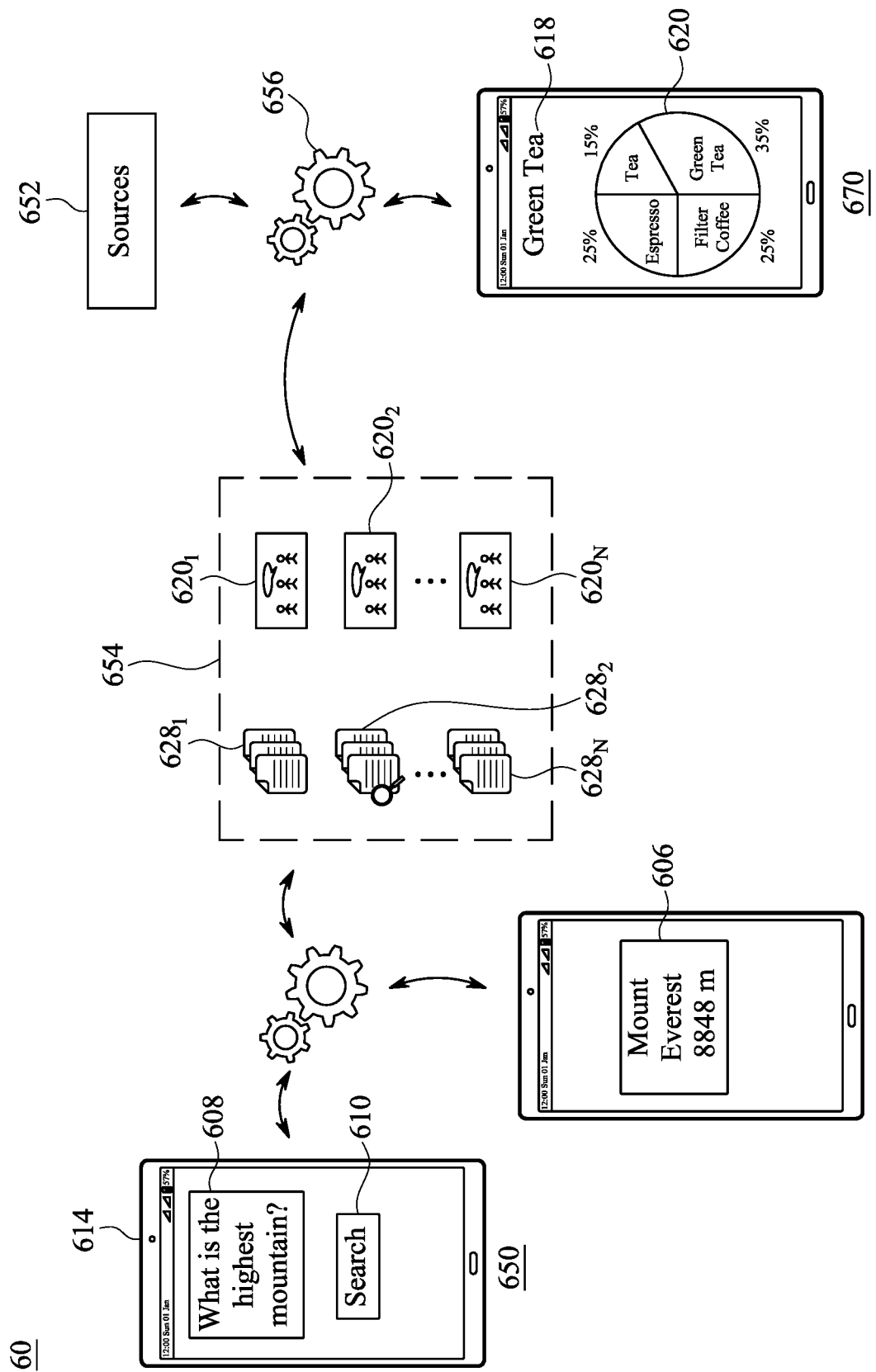
FIG. 6 demonstrates an embodiment 60 of a user interface illustrating a search operation in accordance with the invention.

FIG. 6 demonstrates an embodiment 60 of a user interface in accordance with the invention as a screen shot diagram. The user interfaces show a process of the inventive search operation. The user interfaces could be displayed for example on a touchscreen of a mobile client device 614, such as a smartphone. Processes that run in the background by the search engine 500 and that are not visible to a user of the mobile client device 614 are shown in dashed line.

FIG. 6 illustrates user interfaces used by a human user when inputting a query to the search engine via an Internet browser, or a mobile app. The user interface 650 displays the search engine webpage screenshot on a mobile device. The user could operate the invention also by using a search engine mobile application.

The user provides a query into text box 608 provided therein. A 'search' button 610 is provided for the user to trigger a search operation. A box 654 (shown in dashed line) illustrates a background operation in response to triggering the search operation.

The search engine 500 determines whether the query has an unambiguous factual answer. In response to determining that the query has an unambiguous factual answer, the search engine 500 determines that a crowd-sourced answer is not to be sought. Subsequently, the search result 606 is displayed to the user on mobile client device 614 screen.

However, in response to determining that the query does not have an unambiguous factual answer, the search engine 500 determines that a crowd-sourced answer is required. The search engine 500 analyzes indexed documents $628_{1-N}$ to determine at least one crowd-sourced answer $620_{1-N}$. The dashed block 654 illustrates the process of performing analysis on the indexed documents $628_{1-N}$ to determine the at least one crowd-sourced answer. The veracity module 532 subjects the most popular crowd-sourced answer to a veracity test. A gear block 656 shows veracity testing process. The veracity module 532 can be installed on the mobile client device as a mobile app in connection with the search engine 500, within the search engine 500, or parts of the veracity module 532 can be distributed between the mobile client device 614 and the search engine 500.

In response to failure of the veracity test, the veracity module 532 subjects the next most popular crowd-sourced answer to the veracity test using reference sources 652 which may include any of the following: verification database, government website, fact checking website or the like.

The process of performing veracity tests to the popular crowd-sourced answers is performed until a crowd-sourced answer or search result passing the veracity test is found. The most popular crowd-sourced answer or search result passing the veracity test is ranked first. The interface 670 illustrates a search result screenshot of the mobile device 614 comprising the crowd-sourced answer 618 and a graph 620 illustrating percentage breakdown of answers and/or search results.

Consider again the question "What is the highest mountain?" in the box 608. The inventive search determines an answer distribution as shown in FIG. 2C. A veracity test is now performed. Hundreds of university websites that have been fact checked by an external fact checking website recite that the highest mountain is Mount Everest at 8848 m. So this answer clearly passes the veracity test. Consequently, the answer "Mount Everest 8848 m" is produced as the answer and/or search result and displayed in box 606 to the user on the mobile client device 614 screen.

However, consider again the question: "which one is preferred: Espresso, Filter coffee, Tea, Green Tea, which would also be typed into box 608. After the search button 610 is pushed by the user, the search engine derives the percentages shown in FIG. 2D, namely Espresso 30%, Filter Coffee 25%, Tea 35%, Green Tea 10%.

Now consider fictional scenario that the sources 652 include a widespread Global consumer study where 10,000 consumers were interviewed in Starbucks™ locations around the world conducted last month, which indicated that 50% of the respondents said "Green Tea" was their preferred drink. When the veracity test of the crowd sourced search result is verified against this information source, the veracity test is failed by this set of crowd sourced answers and/or search results. The crowd-sourced answer 618 represents the most probable or popular answer that has passed the veracity test. Thus, the search results or answer displayed in 2D are not displayed here due to the failure of the veracity test.

Now, suppose the next highest ranked crowd sourced search result or answer to the same query was: Espresso 25%, Filter Coffee 25%, Tea 15%, Green Tea 35%. This difference could be caused for example by all documents favoring normal Black Tea being very old, and some of them being disqualified by the search engine when producing the $2^{nd}$ crowd sourced search result. The aforementioned $2^{nd}$ ranked search result with Green Tea at 35% passes the veracity test. "Green Tea" is displayed in 618, as it is the answer. A Pie chart showing the percentage is displayed in 620. The veracity score could also be shown to the user, for example as a probability percentage of the answer/search result being correct in comparison to the next best search result, or a margin of error +−10% could be displayed to the user in accordance with the invention.

Any features of embodiment 60 may be readily combined or permuted with any of the other embodiments 10, 20, 21, 22, 23, 30, 40, 50, 70, 80, 90, and/or 91 in accordance with the invention.

Figure 7:
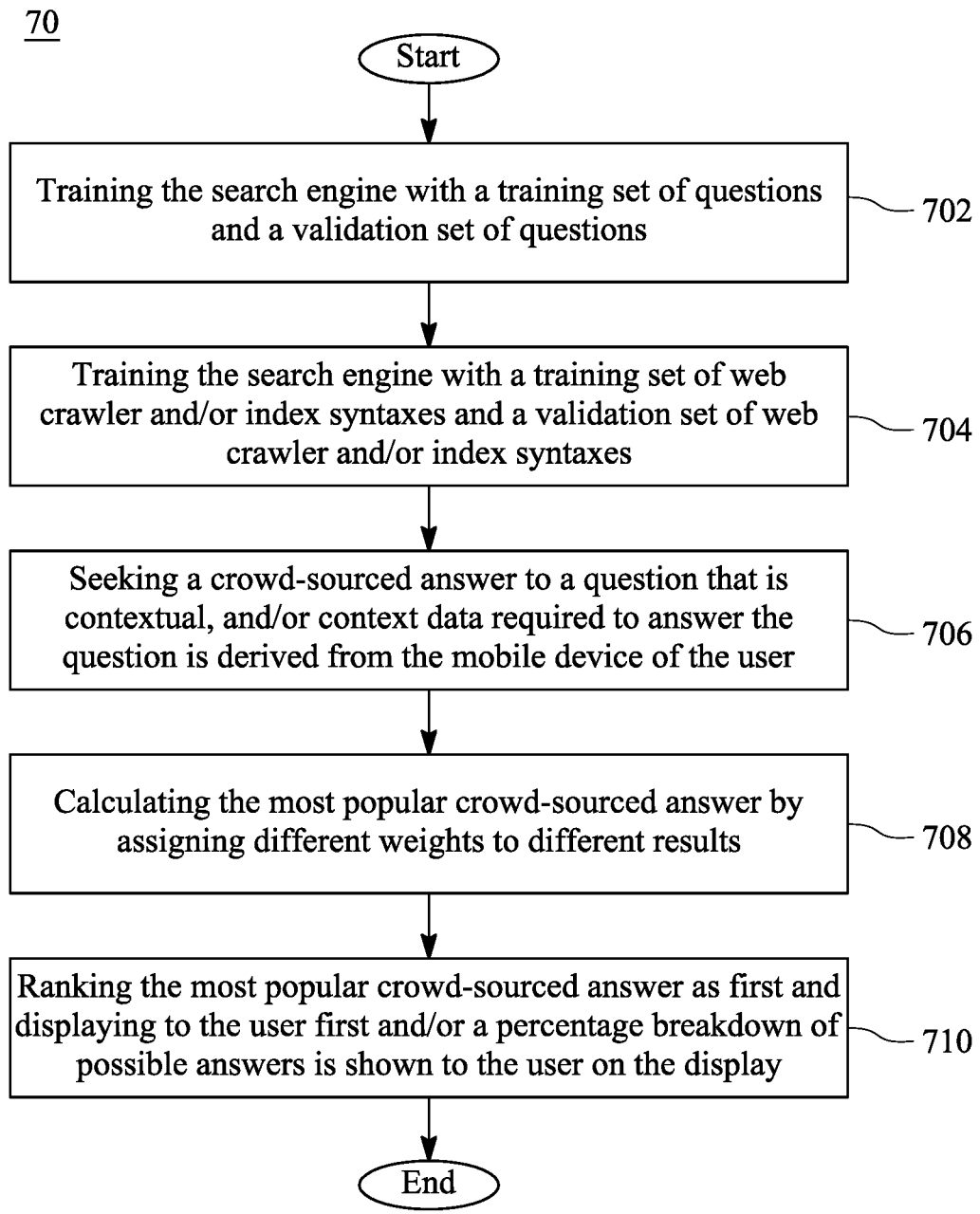
FIG. 7 illustrates an embodiment 70 of a flow chart illustrating a method of performing a search in accordance with the invention.

FIG. 7 illustrates an embodiment 70 of a method of performing a more elaborate contextual crowd sourced search in accordance with the invention as a flow chart. The different phases/steps mentioned in FIG. 7 are not necessarily performed in mentioned sequence, but could be performed in different sequences, or separately.

In phase 702, the search engine is trained with a training set of queries and answers and a validation set of queries and answers. The process of training a search engine is described in FIG. 2B.

Similarly, the search engine is trained with a training set and a validation set of web crawler and/or index syntaxes in phase 704. The search engine is trained to handle queries that may have never been asked, but are anatomically and grammatically similar to queries that have been asked.

Consider that the search engine encounters a query that has never been asked. For example: Which one, Broccoli or a Cauliflower, is preferred more? The search engine may have never answered the query. However, the search engine determines that similar type of query was answered before. The search engine determines that it had answered a previous query: "What is preferred Pain au Chocolat or a plain Croissant". However, the search engine recognizes that the keywords and the documents for the query are different.

As the search engine now has a different set of keywords, it uses the same search index syntax as with the earlier query: "What is preferred Pain au Chocolat or a plain Croissant", to search for documents relating to Broccoli and/or Cauliflower.

Similarly, the search engine may use the same web crawler syntax that was used to crawl documents for Pain au Chocolat and Plain Croissant documents, as it now crawls for Broccoli and Cauliflower documents.

Both queries produce answer distribution images that can be subjected to a veracity test. Using both the answer distribution images that have passed veracity tests and the queries, the search engine can be taught, using the AI method in 2B, to recognize a query that requires a crowd sourced answers, but also the search index syntax that will achieve those search results that will pass the veracity test.

Thus, in some embodiments the search engine will machine learn to select the search index syntax, or those search index syntaxes, which will produce an answer distribution image passing the veracity test first.

Similarly and analogously for web crawler syntaxes, the web crawler syntaxes and the answer distribution images that passed the veracity tests can be correlated. I.e. the search engine can be taught to deploy those web crawler syntaxes immediately, which will crawl the Internet in such a way that answer distribution images passing the veracity test will result. By repeating the FIG. 2B process, when encountering an unknown query, the search engine will thus recognize the correct or suitable web crawler syntax, and immediately begin crawling the Internet with the right syntax, but with new words or terminology. This process of the improving search index syntaxes and web crawler syntaxes is preferably continuous, i.e. operates day and night.

In phase 706, a crowd-sourced answer to a query that is contextual is sought. Context data required to answer the query is sought from a client device of a user. The context data may include location, historical data, and time. In the query: What is preferred "Pain au chocolat" or a "plain Croissant", it is determined that the user is in Finland. Taking the context as Finland, the indexed documents may be analyzed to determine available answers for the queries and more specifically relevant to Finland. Further, a crowd-sourced answer is generated based on the analysis of the indexed documents in context of Finland, which may include documents that are in the Finnish language, are published in Finland or from Finnish network computers, written by a Finnish author, or about Finland or the like. The crowd-sourced answer is delivered along with the analysis. This way the user will learn which of the two French pastries Finns like more.

In phase 708, the most popular crowd-sourced answer is calculated by assigning different weights to different results. The weights are assigned based on various parameters such as quality, popularity, authenticity and reviews of the web pages. The crowd-sourced answers formed from reputed sources have higher weight compared to other crowd-sourced answers from less reputed sources. Alternatively, the crowd-sourced answers formed from popular sources have higher weight compared to crowd-sourced answers derived from less popular sources. A mix of weight parameters may be used to assign the weights to crowd-sourced answer.

In phase 710, the most popular crowd-sourced answer is ranked as first. In some embodiments, the popular crowd-sourced answers are ranked by applying the veracity test. The most popular crowd-sourced answer that passes the veracity test is ranked first. The other crowd-sourced answers that pass the veracity tests are ranked based on the popularity. In one implementation, the first ranked crowd-sourced answer is displayed as text or a hyperlinked text result along with percentage breakdown of possible answers. The most popular crowd-sourced answer that passed the veracity test is typically ranked first and displayed along with a percentage breakdown of possible answers.

Any features of embodiment 70 may be readily combined or permuted with any of the other embodiments 10, 20, 21, 22, 23, 30, 40, 50, 60, 80, 90, and/or 91 in accordance with the invention.

Figure 8:
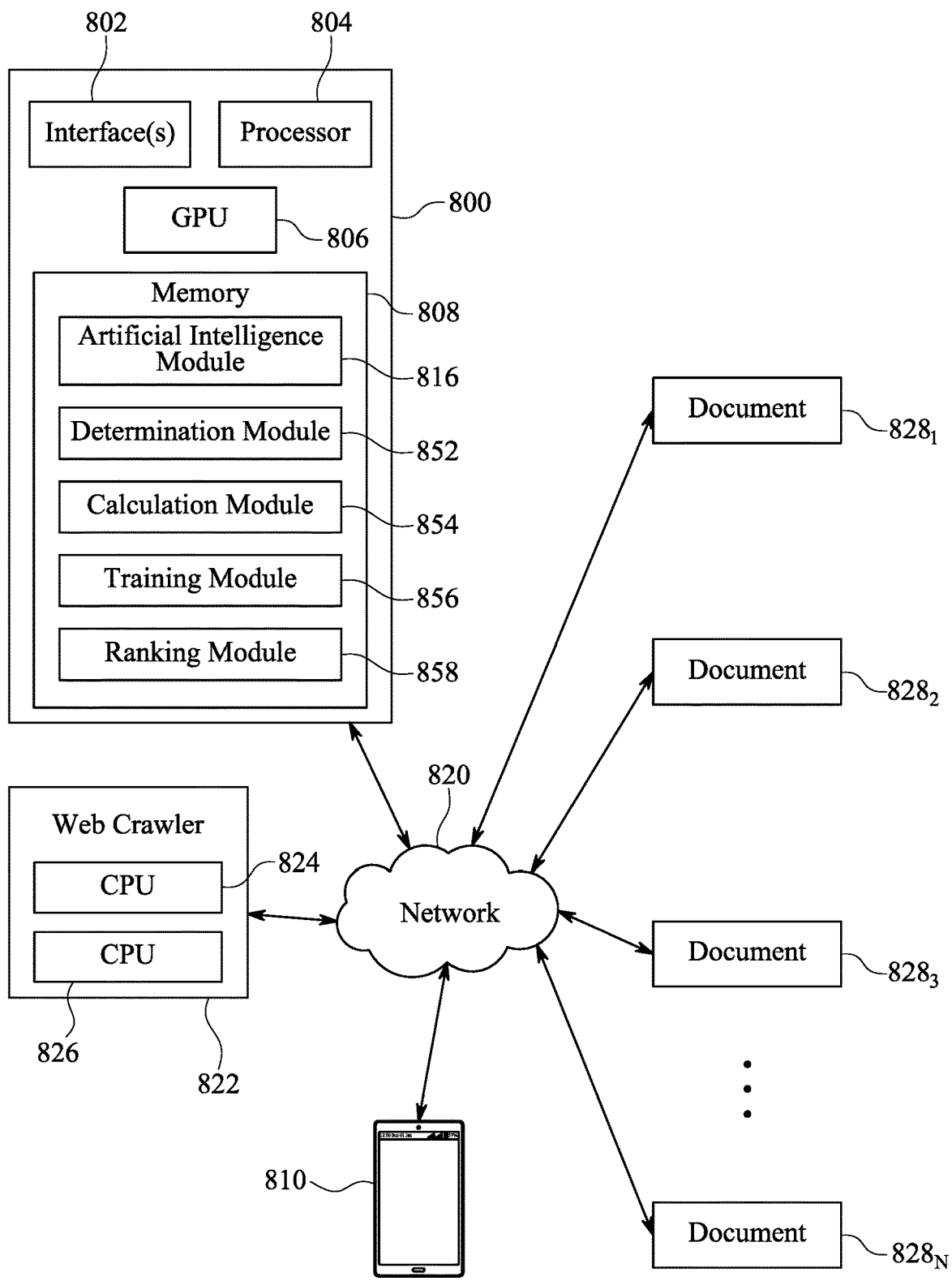
FIG. 8 illustrates an embodiment 80 of a block diagram of a system comprising a search engine in accordance with the invention.

FIG. 8 illustrates an embodiment 80 of a block diagram of system comprising a search engine 800. The search engine comprises a processor 804 and/or a GPU 806, and a memory 808. The memory 808 comprises a determination module 852, a calculation module 854, a training module 856, and a ranking module 858. The search engine 800 is coupled with a client device 810 and a web crawler 822 through a communication network 820. The search engine 800, the GPU 806, the processor 804, and the communication network 820 are similar to the search engine 200, the GPU 206, the processor 204, and the communication network 220 shown in FIG. 2A.

In operation, the determination module 852 seeks a crowd-sourced answer to a query that is contextual. The determination module 852 derives a context data required to answer the query from the client device 810 of the user. The determination module 852 determines a context of the query provided by the user from the client device 810.

Consider the above example of user asking for: "What is preferred: Pain au Chocolat or a plain Croissant?", in Finland. The determination module 852 determines that the user is in Finland. Taking the context as Finland, the determination module 852 analyzes the indexed documents $828_{1-N}$ to determine available answers for the queries and more specifically relevant to Finland. The determination module 852 generates a crowd-sourced answer based on the analysis of the indexed documents in context of Finland and delivers the crowd-sourced answer along with the analysis, e.g. percentage breakdowns to the user.

The calculation module 854 calculates the most popular crowd-sourced answer by assigning different weights to different results. The weights are assigned based on various parameters such as quality, popularity, authenticity and reviews of the web pages. For example, the crowd-sourced answers formed from reputed sources may have higher weight compared to other crowd-sourced answers formed from less reputed information sources. In another example, the crowd-sourced answers formed from popular sources may have higher weight compared to other crowd-sourced answers formed from less popular information sources. The calculation module 854 uses a mix of weight parameters to assign the weights to crowd-sourced answers.

The training module 856 is configured to train the search engine 800 with a training set of queries and answers and a validation set of queries and answers. The way the training module 856 trains the search engine 800 with a training set of queries and a validation set of queries is described in detail in conjunction with FIG. 2B.

In some embodiments the training module 856 further trains the search engine 800 with a training set of web crawler and/or index syntaxes, and a validation set of web crawler and/or index syntaxes. The way the training module 856 trains the search engine 800 with a training set of web crawler and/or index syntaxes, and a validation set of web crawler and/or index syntaxes is described in detail in conjunction with FIG. 9B.

The ranking module 858 then ranks the most popular crowd-sourced answer as first. In some embodiments, the ranking module 858 ranks the popular crowd-sourced answers by applying the veracity test. The most popular crowd-sourced answer that passes the veracity test is ranked as first. The other crowd-sourced answers that pass the veracity tests are ranked based on their popularity. In one implementation, a display module (not shown in FIG. 8) displays the first ranked crowd-sourced answer as a hyperlinked text result along with percentage breakdown of possible answers. The most popular crowd-sourced answer that has passed the veracity test is ranked first and is displayed along with a percentage breakdown of other possible answers. The display module also displays a graph illustrating the distribution of the search results that formed the most popular crowd-sourced answer. The display module also provides options to select portions of answer and portion of chart for displaying additional information.

Any features of embodiment 80 may be readily combined or permuted with any of the other embodiments 10, 20, 21, 22, 23, 30, 40, 50, 60, 70, 90, and/or 91 in accordance with the invention.

Figure 9A:
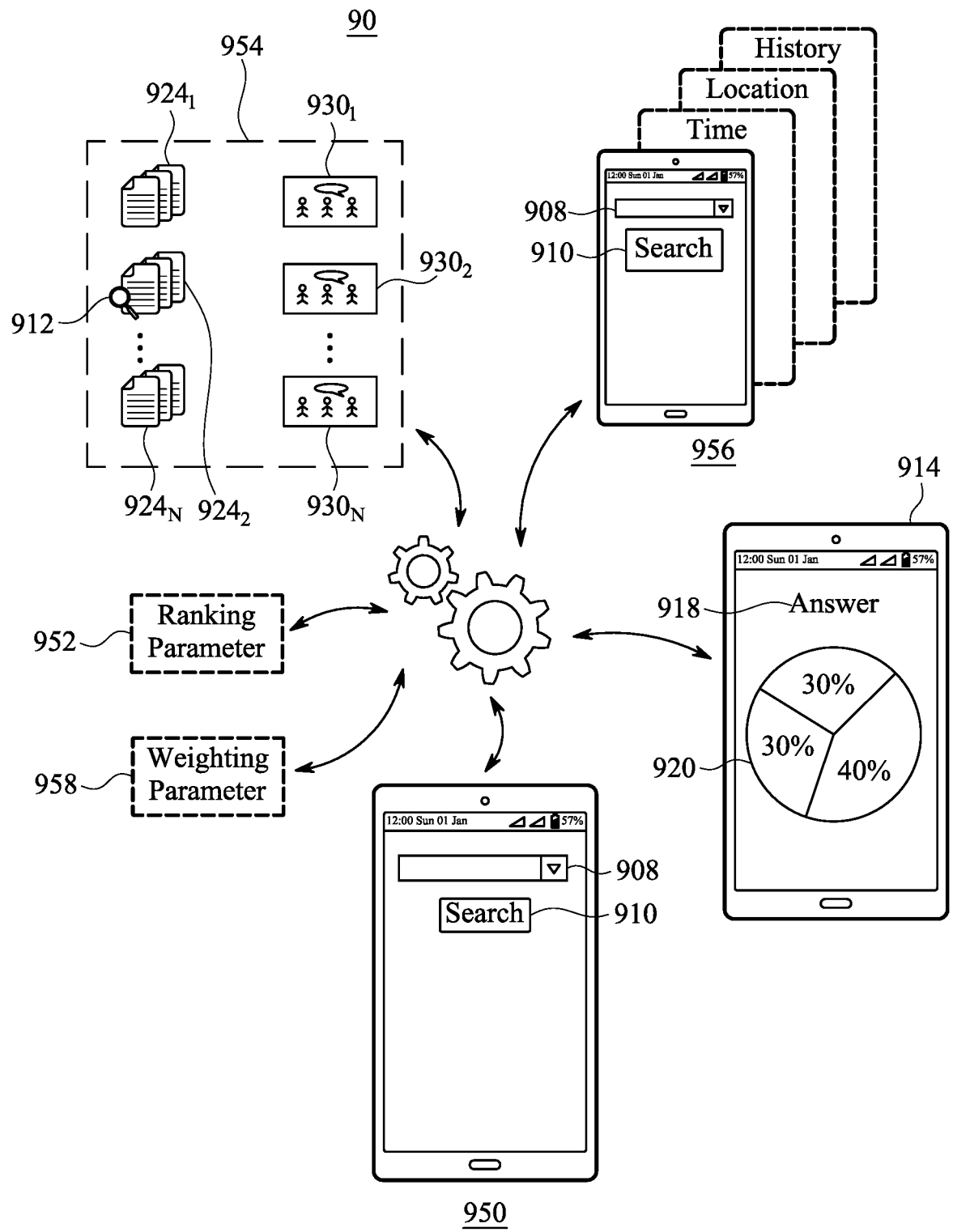
FIG. 9A illustrates an embodiment 90 of exemplary interfaces that are generated in response to a user adding a query to the search engine that does not have a factual answer in accordance with the invention.

FIG. 9A demonstrates an embodiment 90 of a user interface in accordance with the invention as a screen shot diagram. The user interfaces show a process of search operation with various aspects. The user interface is displayed on a display screen of a mobile client device 914, such as a smartphone.

FIG. 9A illustrates an interface that is provided to a user for inputting a query to a search engine via a webpage accessed with an Internet browser or a mobile application.

This time the query does not have a single factual answer. The search engine application is stored on a non-transient memory medium i.e. a memory of the mobile client device 914, while the server side of the search engine is in the cloud.

The graphical interface 950 illustrates the search engine 800 viewed via an Internet browser, or with a mobile application, realized on the touch screen of the mobile device. A user provides a search query into text box 908 provided therein. A 'search' button 910 is provided for the user to trigger a search operation. A box 954 (shown in dashed line) illustrates a background operation of the search.

The search engine 800 searches (search operation 912) the indexed documents $924_{1-N}$ to determine at least one crowd-sourced answer. The search engine 800 uses context information 956 derived from the mobile device of the user, in determining the at least one crowd-sourced answer. The box 956 (shown in dashed line) shows context information such as time, location and history.

The search engine 800 also uses weight parameters 958 including quality, popularity, authenticity and reviews of the documents while determining the at least one crowd-sourced answer. The AI search engine ranks the crowd-sourced answers using the weight parameters 958. The context information 956, the weight parameters 958 and the ranking parameters 952 are illustrated in dashed boxes as background operations. Touch screen User Interface 914 illustrates a search result screenshot retrieved to the mobile device with answer 918 and a graph 920 illustrating the percentage breakdown of the crowd sourced answers. The breakdown between different answers can also be expressed in other formats, not just as a percentage. For example fractions, or a mere graphical illustration of the answer distribution can be used.

Any features of embodiment 90 may be readily combined or permuted with any of the other embodiments 10, 20, 21, 22, 23, 30, 40, 50, 60, 70, 80, and/or 91 in accordance with the invention.

Figure 9B:
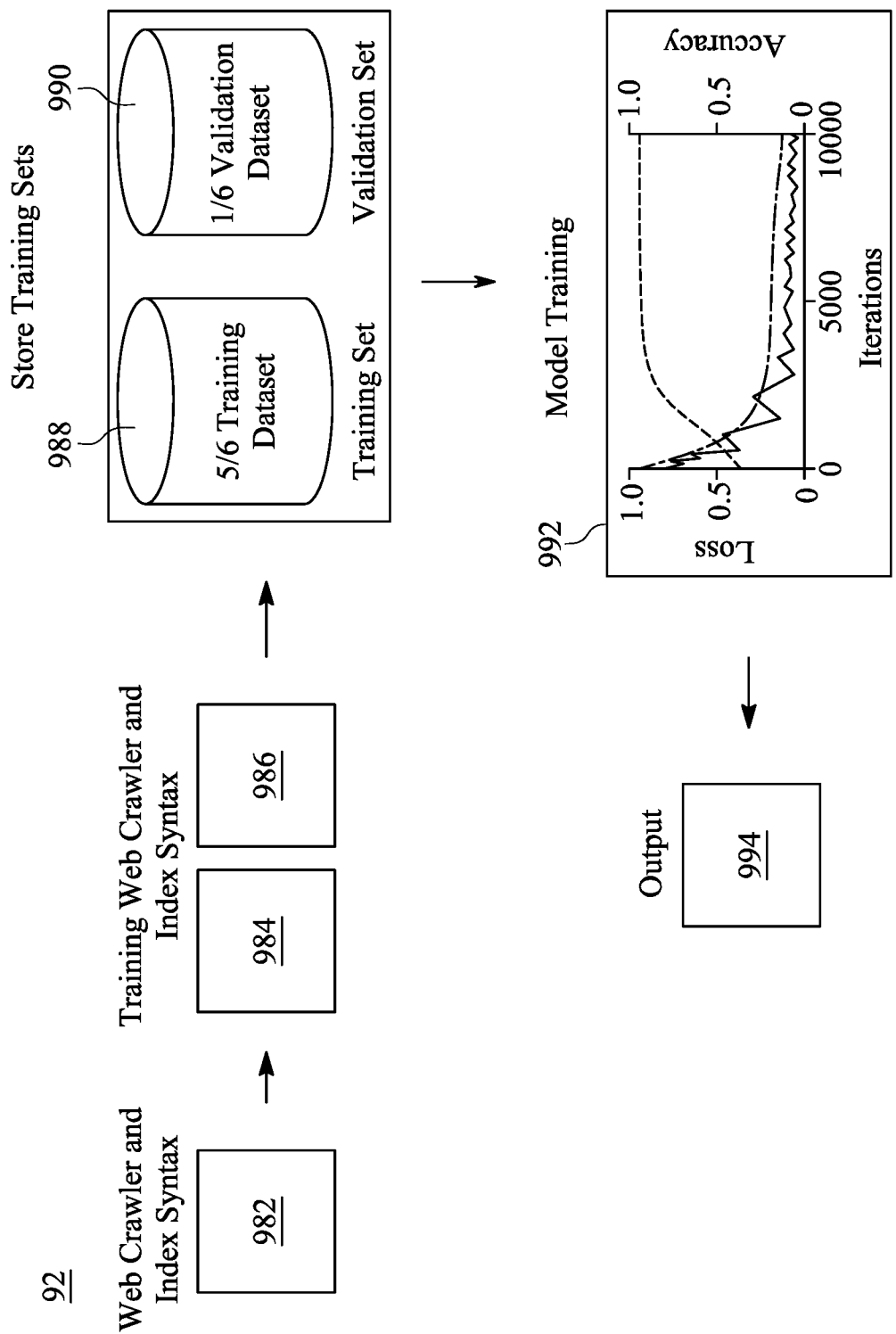
FIG. 9B illustrates a machine learning embodiment 91 where artificial intelligence is used for training the search engine with a training set of web crawler and/or index syntaxes and a validation set of web crawler and/or index syntaxes in accordance with the invention.

FIG. 9B illustrates a machine learning embodiment 91 where artificial intelligence is used for training the search engine 800 with a training set of web crawler syntaxes and/or index syntaxes and a validation set of web crawler syntaxes and/or index syntaxes.

Similarly to training the search engine 200 in determining whether the query has a factual answer or non-factual answer, the training module 856 uses a training dataset 982 of at least 30000 web crawler and/or index syntaxes aimed at crowd sourcing answers from the Internet to individual human questions and the respective answer distribution images that these syntaxes produce with certain keywords. The training dataset 982 is then divided into two subsets 984 and 986. First subset called the training set 988 comprises $\frac{5}{6}^{th}$ portion of the training dataset that are used for training a model. The second subset called the validation set 990 comprises $\frac{1}{6}^{th}$ portion of the training dataset that are used for calculating and validating accuracy of the model.

The training module 856 then performs feature standardization of the answer distribution images, used for creating the training model. The training module 856 defines the training model by selecting CNN architecture. The processor 804 uses a CNN architecture model such as Alexnet for defining the model. The training module 856 then optimizes the model using a solver algorithm by computing an accuracy of the model using the training dataset.

Thus the AI, develops a model for correlating index and web crawler syntaxes, with answer distribution images that these syntaxes produce when query words are entered.

The solver algorithm computes the accuracy using the validation set. For example, the solver algorithm may use the validation set 990 for every 1000 iterations in an optimization process of 40000 iterations that takes a snapshot of the trained model at every $5000^{th}$ iteration. The training module 856 performs model training 992 using the results of the solver algorithm. During the training process, the processor 804 monitors losses and the model accuracy. The training module 856 performs multiple iterations until a steady-state accuracy rate is achieved. Once the trained model is ready, the training module 856 starts predicting accuracy of web crawler and index syntaxes from the testing dataset. The AI module uses the trained model for analysis of the web crawler and index syntaxes.

Preferably the trained model is used to predict effective search index and web crawler algorithms when an unencountered non-factual search query is received, thus enabling timely and accurate response to unencountered search queries with crowd sourced answers that pass the veracity test.

Any features of embodiment 91 may be readily combined or permuted with any of the other embodiments 10, 20, 21, 22, 23, 30, 40, 50, 60, 70, 80, and/or 90 in accordance with the invention.

The invention has the advantage of providing accurate or near accurate answers for queries that have non-factual answers. For example, a new café owner wants to prepare plain Croissants and Pain au Chocolats for the next day. The café owner may not know the quantity of plain Croissants and Pain au chocolat to be prepared. The café owner can ask the search engine on what people prefer: plain Croissants or Pain Au Chocolat? The search engine may perform the search and may apply location context. The search engine may generate crowd-sourced answer based on the query and context. The search engine may present that 70% people in the local area prefer Pain au chocolat over plain Croissant. The results would indicate the preferences of people around the region. The results would help the café owner to make an informed decision according to preferences of the people in the region. Accordingly, the café owner can prepare Pain au chocolat and plain Croissants in corresponding quantities. The café owner can prepare 14 Pain au chocolat and 6 plain Croissants when number of items to be baked is 20 items.

In some embodiments the context may have a temporal nature also. For example, the concurrency of the documents or search queries can be deduced to enhance the weight of a non-factual search term. Suppose for example that the local city has a Cinnamon Bun festival, and in the past hour "Cinnamon Bun" has been a very frequent search term. If a Non-factual query "What people prefer, croissants or Cinnamon Buns?" is then submitted to the search engine, the search engine may return "Cinnamon Bun" as the top answer on that day, even though, Croissants would generally be more preferred all year long by the public of that city.

Therefore, it is in accordance with the invention that some context parameters such as location and/or time may influence ranking weights separately or in combination. This type of weighing and ranking procedure is already explained in an earlier publication of the inventor, WO 2012/104474 A1 "Method and means by browsing and walking, which is cited here as reference"

In all embodiments document clustering can be used to realize the search index and search results. In this approach a group of documents, for example the Internet documents is indexed with a "bag of words" approach. I.e. we define a lexicon of N words, and each document is an N dimensional binary vector whose element I is 1 if word or string appears in the document, and suffixes "-s" and "-ing" are removed, and non-informative words "of", "and" are not used. The documents are then grouped depending on the number of shared words. It is of course critical how the lexicon is chosen, and in this case the lexicon should reflect the words of the query and/or potential answers to the query. In some embodiments hierarchical clustering is used, and some embodiments may use agglomerative clustering and/or divisive clustering separately or together in sequences.

In one embodiment the clustering is done by making the choice of the number of clusters beforehand. The inventor currently thinks that doing clustering to 3 or 4 clusters is a good choice, as shown in this specification. If almost all documents cluster to one cluster out of the 4, and the two to three remaining clusters only have a small number of documents, then probably the one cluster with almost all the documents provides a factually true answer in those documents to a factual question. However, if 1-3 competitors emerge in different clusters, it might be that we are dealing with a non-factual issue.

For example if the question is "What is the highest mountain on Earth?", the bag of words could include "highest mountain", "Mount Everest, "K2", "Mauna Kea". The cluster of "Mount Everest" would dominate the two other clusters, indicating this is a factual question with a factual answer, as explained before. One alternative to configure the index would for example be to require the "highest mountain" appears in the document, and then cluster those documents that have it to "Mount Everest", "K2", "Mauna Kea".

Then consider the question "Which one is preferred: Espresso, Filter Coffee, Tea, Green Tea". The bag of words could include: "Preferred", "Espresso", "Filter Coffee", "Tea", "Green Tea". When the documents are clustered to 4 clusters, one for each beverage, the clusters collect roughly the same number of documents 30%, 25%, 35%, 10%, as explained with FIG. 2D for example. One alternative to configure the index would be for example to require the "preferred" to appear in the documents, and then cluster those documents in which "preferred" appears, to 4 clusters: "Espresso", "Filter Coffee", "Tea", "Green Tea".

So that documents where "Espresso" appears and "preferred" appears are clustered to one cluster. Documents where "Filter Coffee" and "preferred" appear are clustered to another $2^{nd}$ cluster. Documents where "Tea" and "preferred" appear are clustered to yet another $3^{rd}$ cluster. And documents where "Green Tea" and "preferred" appear are clustered to yet another $4^{th}$ cluster. In some embodiments, it is also possible that hierarchical clustering could be used to distinguish the "Tea" and the "Green Tea" from one another. As green tea is a species of the genus tea, it could be possible to subtract the green tea documents that do not have "Tea" without the "Green" prefix. This would distinguish the documents more strictly between "Tea" and "Green Tea", which might be a preferred option in some embodiments of the invention.

For more details on clustering, please refer to "Introduction to Machine Learning", which textbook is incorporated here as reference.

In all embodiments of the invention the user query can be formulated as a question, but does not necessarily need to. The query can also be a text string or a data string to which a match is sought. The invention can perform the search based upon seeking matches to the query data in the search index and providing the search results to the user.

The invention provides a great advantage to the public who seeks the truth. The invention is capable of distinguishing factual questions from non-factual questions. It provides a factual answer to a factual question. Further, it provides at least a somewhat objectively truthful answer to a non-factual question, which by its nature may have a non-factual or "matter of taste" answer. At least it will be truthful to the extent that the submitter of the query can actually use the answers provided by the invention without being intentionally or unintentionally mislead.

The invention has been explained above with reference to the embodiments. However, the invention is not only restricted to these embodiments but comprises all possible embodiments within the spirit and scope of the inventive thought and the following patent claims.

REFERENCES

US 2018/0308473 A1 COMPENSATING FOR BIAS IN SEARCH RESULTS, published on Sep. 20, 2018, Eric Joel HORVITZ;
A PRACTICAL INTRODUCTION TO DEEP LEARNING WITH CAFFE AND PYTHON, published on Jun. 26, 2016, Adil Moujahid.
PCT/FI2018/050841 (unpublished application), incorporated herein as reference, Mikko Väänänen.
https://en.wikipedia.org/wiki/Natural_language_processing.
https://en.wikipedia.org/wiki/Autonatic_content_recognition.
https://en.wikipedia.org/wiki/Speech_recognition#End-to_end_automatic_speech_recognition.
WO 2012/104474 A1, Method and means for browsing by walking, 2012, Mikko Väänänen.
Introduction to Machine Learning, $3^{rd}$ Edition, Ethem AlPaydin, ISBN:978-81-203-5078-6, www.phindia.com

What is claimed is:
1. A search engine connected to at least one mobile device and at least one web crawler,
characterized in that,
the web crawler is configured to index documents and classify said documents,
the determination to seek a crowd-sourced answer is done for queries that are determined not to have a factual answer, the determination to seek a crowd-sourced answer is not done for queries that are determined to have a factual answer, the factuality of the answer and/or the query is determined based on the dispersion of different answers to the query, so that a greater dispersion among different answers to the query exceeding a numerical threshold is determined to imply non-factuality of the query and/or the answer, and a lesser dispersion of different answers not exceeding the numerical threshold to the query is determined to imply a greater factuality of the query and/or the answer, the search engine receives a non-factual query from the user of the mobile device which is determined to be best answered by a crowd-sourced answer, the search engine searches the documents and delivers at least one crowd-sourced answer, and the crowd-sourced answer is displayed to user on a display of the mobile device, so that a most popular crowd-sourced answer is ranked first and displayed to the user first and/or a breakdown or selection of possible answers is shown to the user on the display.

2. A search engine as claimed in claim 1, characterized in that, a most popular crowd-sourced answer is subjected to a veracity test, and if the veracity test is failed, the most popular search result passing the veracity test is ranked first.

3. A search engine as claimed in claim 1, characterized in that, the web crawler is configured to crawl and index any of the following individually or in a mix: text, voice, image and/or video.

4. A search engine as claimed in claim 1, characterized in that, a crowd-sourced answer may be sought to a query that is contextual, and/or context data required to answer the query is derived from the mobile device of the user.

5. A search engine as claimed in claim 4, characterized in that, a most popular crowd-sourced answer is calculated by assigning different context weights to different results.

6. A search engine as claimed in claim 5, characterized in that, the said context weights are user location dependent and/or user time dependent.

7. A search engine as claimed in claim 1, characterized in that, the search engine is trained with a training set of queries and a validation set of queries.

8. A search engine as claimed in claim 1, characterized in that, the search engine is trained with a training set of web crawler and/or index syntaxes and a validation set of web crawler and/or index syntaxes.

9. A method of performing a search by a search engine, the search engine connected to at least one mobile device and at least one web crawler, characterized in that, configuring the web crawler to index documents and classify said documents, determining to seek a crowd-sourced answer for queries that are determined not to have an unambiguous factual answer, determining to seek a crowd-sourced answer is not done for queries that are determined to have an unambiguous factual answer, the factuality of the answer and/or the query is determined based on the dispersion of different answers to the query, so that a greater dispersion among different answers to the query exceeding a numerical threshold is determined to imply non-factuality of the query and/or the answer, and a lesser dispersion of different answers to the query not exceeding the numerical threshold is determined to imply a greater factuality of the query and/or the answer, receiving a query from the user of the mobile device which is determined to be best answered by a crowd-sourced answer, searching said documents and delivering at least one crowd-sourced answer, and displaying the crowd-sourced answer to a user so that the most popular crowd-sourced answer is ranked first and displayed to the user first and/or displaying a breakdown or selection of possible answers to the user on the display.

10. The method as claimed in claim 9, characterized in that, subjecting the most popular crowd-sourced answer to a veracity test, and if the veracity test is failed, the most popular search result passing the veracity test is ranked first.

11. The method as claimed in claim 9, characterized in that, the web crawler crawls and indexes any of the following individually or in a mix: text, voice, image and/or video.

12. The method as claimed in claim 9, characterized in that, seeking a crowd-sourced answer to a query that is contextual, and/or context data required to answer the query is derived from the mobile device of the user.

13. The method as claimed in claim 12, characterized in that, calculating the most popular crowd-sourced answer by assigning different context weights to different results.

14. The method as claimed in claim 13, characterized in that, the said context weights are user location dependent and/or user time dependent.

15. The method as claimed in claim 9, characterized in that, training the search engine with a training set of queries and a validation set of queries.

16. The method as claimed in claim 9, characterized in that, training the search engine with a training set of web crawler and/or index syntaxes and a validation set of web crawler and/or index syntaxes.

17. A search engine system the search engine connected to at least one mobile device and at least one web crawler, characterized in that, a configuration module of the search engine configures the web crawler to index documents and classify said documents, the AI module is configured to seek a crowd-sourced answer for queries that are determined not to have an unambiguous factual answer, the AI module is configured to not seek a crowd-sourced answer for queries that are determined to have an unambiguous factual answer, the factuality of the answer and/or the query is determined based on the dispersion of different answers to the query, so that a greater dispersion among different answers to the query exceeding a numerical threshold is determined to imply non-factuality of the query and/or the answer, and a lesser dispersion of different answers to the query not exceeding the numerical threshold is determined to imply a greater factuality of the query and/or the answer, a receiving module of the search engine is configured to receive a query from the user of the mobile device which is determined to be best answered by a crowd-sourced answer, an Artificial Intelligence (AI) module of the search engine is configured to search the documents and deliver at least one crowd-sourced answer, and a display module of the search engine is configured to display the crowd-sourced answer to a user so that the ranking module ranks first the most popular crowdsourced answer and this answer is displayed first and/or a breakdown or selection of possible answers is shown to the user on the display.

18. The system as claimed in claim 17, characterized in that, a veracity module configured to subject the most popular crowd-sourced answer to a veracity test, and if the veracity test fails, a most popular search result that passes the veracity test is ranked first.

19. The system as claimed in claim 17, characterized in that, the web crawler is configured to crawl and index any of the following individually or in a mix: text, voice, image and/or video.

20. The system as claimed in claim 17, characterized in that, a determination module configured to seek a crowd-sourced answer to a query that is contextual and/or a context module derives context data required to answer the query from the mobile device of the user.

21. The system as claimed in claim 20, characterized in that, a calculation module is configured to calculate the most popular crowd-sourced answer by assigning different context weights to different results.

22. The system as claimed in claim 21, characterized in that, the said context weights are user location dependent and/or user time dependent.

23. The system as claimed in claim 17, characterized in that, a training module is configured to train the search engine with a training set of queries and a validation set of queries.

24. The system as claimed in claim 17, characterized in that, the training module is configured to train the search engine with a training set of web crawler and/or index syntaxes and a validation set of web crawler and/or index syntaxes.

* * * * *